United States Patent
Coenegracht et al.

(10) Patent No.: US 10,180,541 B2
(45) Date of Patent: Jan. 15, 2019

(54) HARDENED FIBER OPTIC CONNECTOR WITH PRE-COMPRESSED SPRING

(71) Applicants: ADC Telecommunications (Shanghai) Distribution Co., Ltd., Shanghai (CN); CommScope Connectivity Belgium BVBA, Kessel-Lo (BE); CommScope Asia Holdings B.V., Bussum (NL)

(72) Inventors: Philippe Coenegracht, Hasselt (BE); Jianfeng Jin, Shanghai (CN); Liming Wang, Shanghai (CN); Jacob Arie Elenbaas, Hertogenbosch (NL)

(73) Assignees: COMMSCOPE CONNECTIVITY BELGIUM BVBA, Kessel-Lo (BE); COMMSCOPE ASIA HOLDINGS B.V., Bussum (NL); ADC TELECOMMUNICATIONS (SHANGHAI) DISTRIBUTION CO., LTD., Shanghai (CN)

( * ) Notice: Subject to any disclaimer, the term of this patent is extended or adjusted under 35 U.S.C. 154(b) by 0 days.

(21) Appl. No.: 15/537,259

(22) PCT Filed: Dec. 19, 2014

(86) PCT No.: PCT/CN2014/094391
§ 371 (c)(1),
(2) Date: Jun. 16, 2017

(87) PCT Pub. No.: WO2016/095213
PCT Pub. Date: Jun. 23, 2016

(65) Prior Publication Data
US 2017/0343741 A1 Nov. 30, 2017

(51) Int. Cl.
*G02B 6/36* (2006.01)
*G02B 6/38* (2006.01)

(52) U.S. Cl.
CPC ......... *G02B 6/3821* (2013.01); *G02B 6/3816* (2013.01); *G02B 6/3825* (2013.01);
(Continued)

(58) Field of Classification Search
CPC .. G02B 6/3821; G02B 6/3816; G02B 6/3825; G02B 6/3849; G02B 6/3871; G02B 6/3889; G02B 6/3894
(Continued)

(56) References Cited

U.S. PATENT DOCUMENTS

| | | |
|---|---|---|
| 5,212,752 A | 5/1993 | Stephenson et al. |
| 5,317,663 A | 5/1994 | Beard et al. |

(Continued)

FOREIGN PATENT DOCUMENTS

| | | |
|---|---|---|
| CN | 102520489 A | 6/2012 |
| CN | 203688854 U | 7/2014 |

(Continued)

OTHER PUBLICATIONS

International Search Report and Written Opinion of the International Searching Authority for corresponding International Patent Application No. PCT/CN2014/094391 dated Sep. 23, 2015, 7 pages.

(Continued)

*Primary Examiner* — Ryan Lepisto
*Assistant Examiner* — Guy Anderson
(74) *Attorney, Agent, or Firm* — Merchant & Gould P.C.

(57) ABSTRACT

A fiber optic connector is disclosed that includes a plug body having a plug end and a connector core that mounts within the plug body. The connector core includes a ferrule subassembly including a ferrule, a ferrule hub that attaches to the ferrule, a spring holder and a connector spring. The ferrule sub-assembly is assembled with the connector spring pre-compressed to an initial compressed state prior to mounting (Continued)

the connector core within the connector body. The plug body and the core are configured such that the connector spring is moved from the initial compressed state to a final compressed state when the connector core is loaded in the plug body. In certain examples, tuning features can be integrated into the connector core.

11 Claims, 24 Drawing Sheets

(52) U.S. Cl.
CPC ......... *G02B 6/3849* (2013.01); *G02B 6/3871* (2013.01); *G02B 6/3889* (2013.01); *G02B 6/3894* (2013.01)

(58) Field of Classification Search
USPC ..................... 385/78, 81, 84, 56, 92, 94
See application file for complete search history.

(56) References Cited

U.S. PATENT DOCUMENTS

| | | | |
|---|---|---|---|
| 5,809,192 A | 9/1998 | Manning et al. | |
| 6,579,014 B2 | 6/2003 | Melton et al. | |
| 6,648,520 B2 | 11/2003 | McDonald et al. | |
| 6,899,467 B2 | 5/2005 | McDonald et al. | |
| 7,044,650 B1 | 5/2006 | Tran et al. | |
| 7,137,742 B2 | 11/2006 | Theuerkorn et al. | |
| 7,146,090 B2 | 12/2006 | Vo et al. | |
| 7,207,727 B2 | 4/2007 | Tran et al. | |
| 7,244,066 B2 | 7/2007 | Theuerkorn | |
| 7,264,402 B2 | 9/2007 | Theuerkorn et al. | |
| 7,467,896 B2 | 12/2008 | Melton et al. | |
| 7,568,844 B2 | 8/2009 | Luther et al. | |
| 7,572,065 B2 * | 8/2009 | Lu ................... | G02B 6/3816 385/55 |
| 7,654,747 B2 | 2/2010 | Theuerkorn et al. | |
| 7,744,286 B2 * | 6/2010 | Lu ................... | G02B 6/3816 385/53 |
| 7,744,288 B2 * | 6/2010 | Lu ................... | G02B 6/3816 385/60 |
| 7,762,726 B2 * | 7/2010 | Lu ................... | G02B 6/3816 385/53 |
| 7,942,590 B2 * | 5/2011 | Lu ................... | G02B 6/3816 385/78 |
| 7,959,361 B2 * | 6/2011 | Lu ................... | G02B 6/3816 385/53 |
| 8,439,557 B2 | 5/2013 | Vaucher et al. | |
| 8,439,577 B2 | 5/2013 | Jenkins | |
| 8,556,520 B2 | 10/2013 | Elenbaas et al. | |
| 8,770,862 B2 * | 7/2014 | Lu ................... | G02B 6/3816 385/77 |
| 9,304,262 B2 | 4/2016 | Lu | |
| 2002/0118928 A1 | 8/2002 | Roehrs et al. | |
| 2008/0175541 A1 * | 7/2008 | Lu ................... | G02B 6/3816 385/62 |
| 2009/0148101 A1 * | 6/2009 | Lu ................... | G02B 6/3816 385/56 |
| 2009/0148102 A1 * | 6/2009 | Lu ................... | G02B 6/3816 385/60 |
| 2009/0148103 A1 * | 6/2009 | Lu ................... | G02B 6/3816 385/62 |
| 2009/0148104 A1 * | 6/2009 | Lu ................... | G02B 6/3816 385/72 |
| 2009/0162016 A1 * | 6/2009 | Lu ................... | G02B 6/3816 385/72 |
| 2010/0266242 A1 * | 10/2010 | Lu ................... | G02B 6/3816 385/53 |
| 2010/0266244 A1 * | 10/2010 | Lu ................... | G02B 6/3816 385/60 |
| 2010/0290741 A1 * | 11/2010 | Lu ................... | G02B 6/3816 385/60 |
| 2014/0064671 A1 * | 3/2014 | Barnette, Jr. .......... | G02B 6/381 385/81 |
| 2014/0314379 A1 * | 10/2014 | Lu ................... | G02B 6/3816 385/72 |

FOREIGN PATENT DOCUMENTS

| | | |
|---|---|---|
| CN | 203688855 U | 7/2014 |
| EP | 1 072 914 A2 | 1/2001 |
| EP | 1 443 350 A2 | 8/2004 |
| EP | 2 302 431 A1 | 3/2011 |
| EP | 2 354 825 A1 | 8/2011 |
| WO | 02/052310 A2 | 7/2002 |
| WO | 2006/076061 A2 | 7/2006 |
| WO | 2015/197588 A1 | 12/2015 |
| WO | 2016/206594 A1 | 12/2016 |

OTHER PUBLICATIONS

Extended European Search Report for corresponding European Patent Application No. 14908248.9 dated Jul. 25, 2018, 8 pages.

* cited by examiner

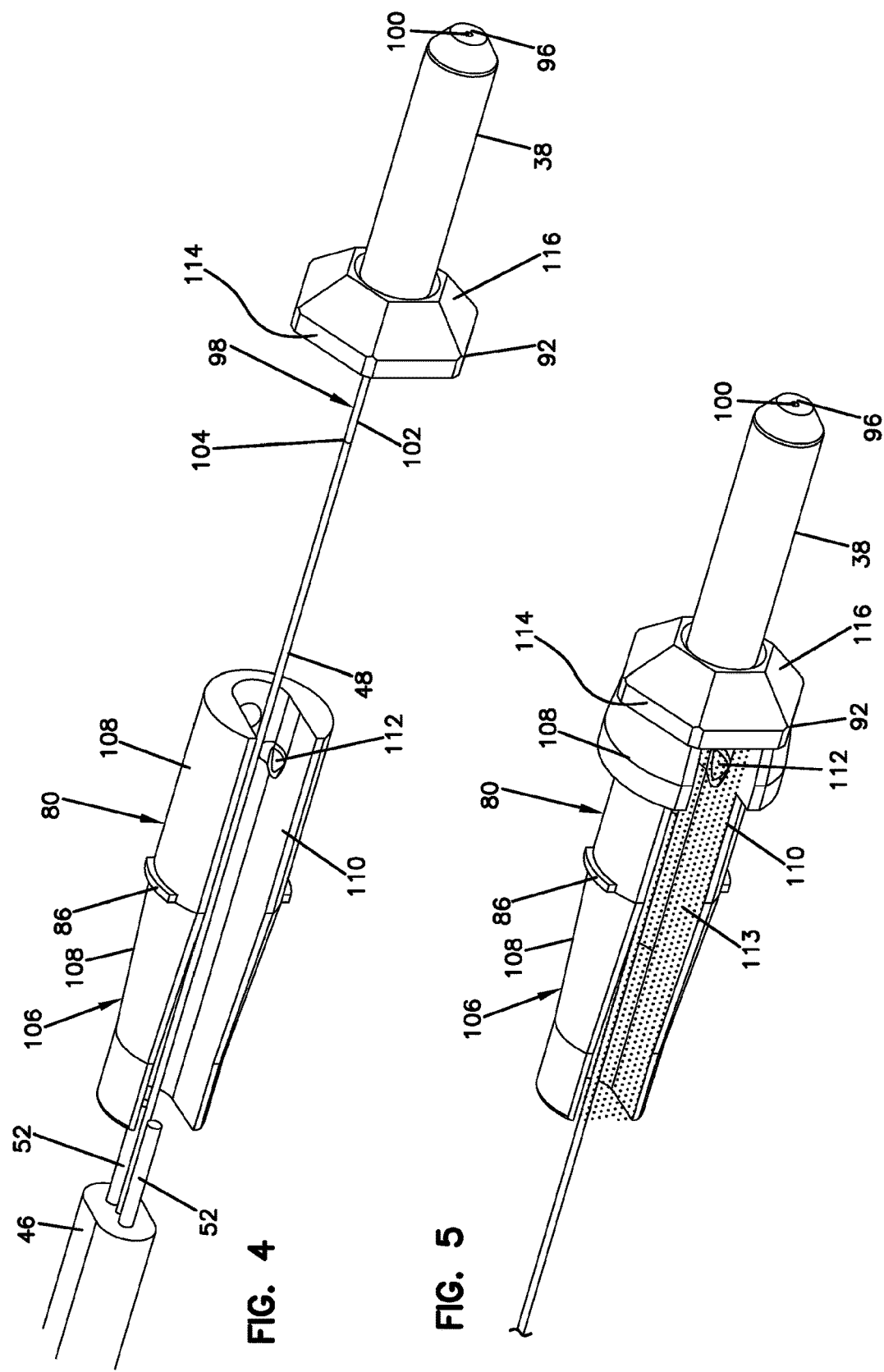

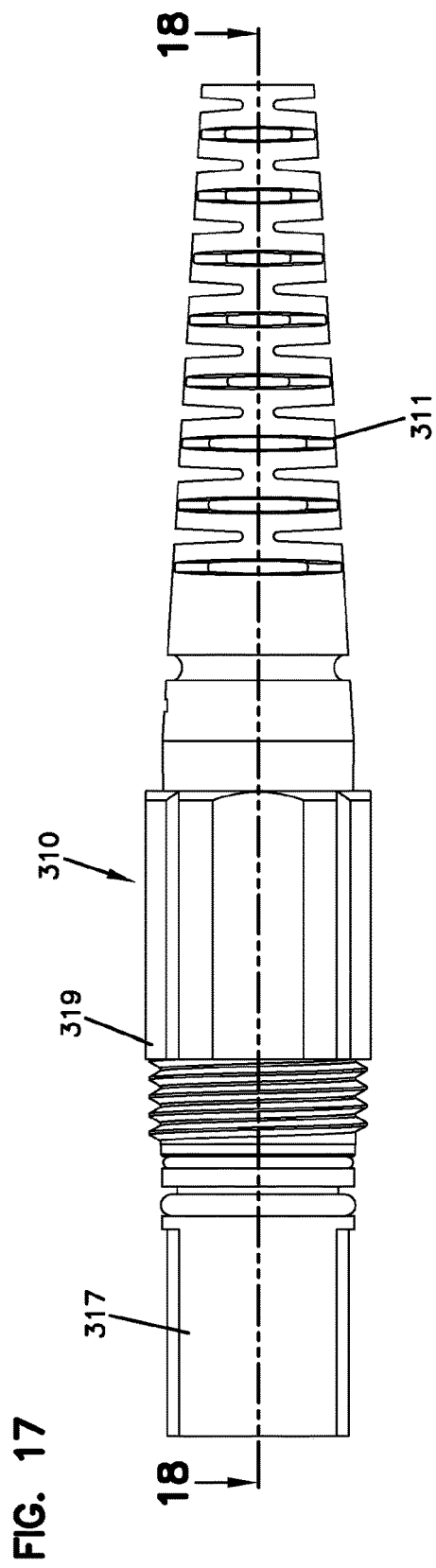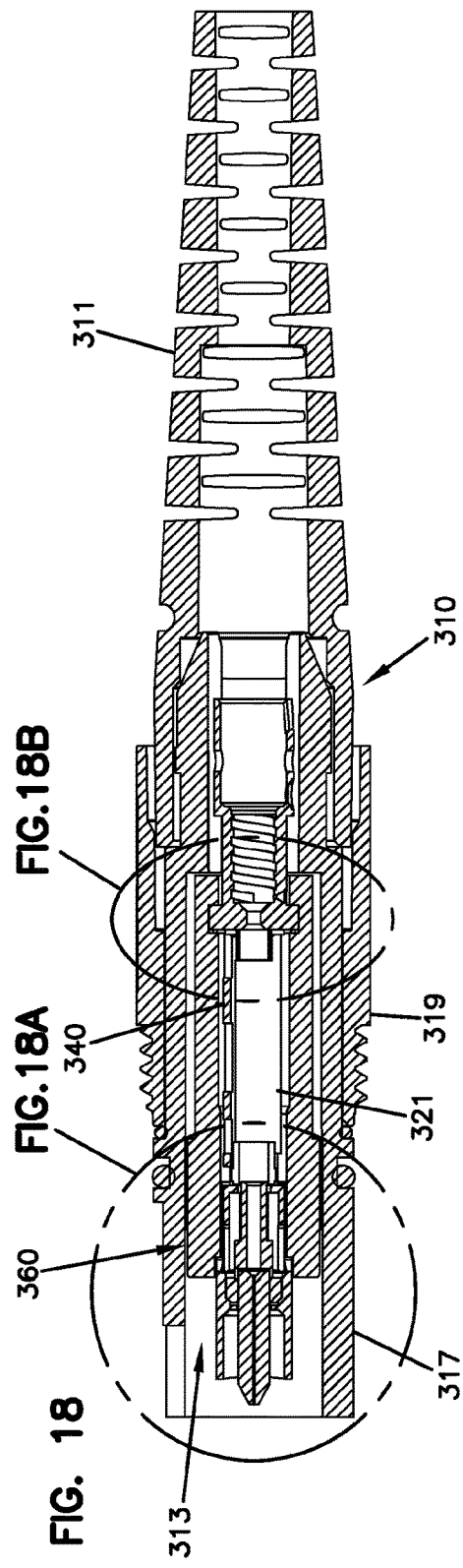

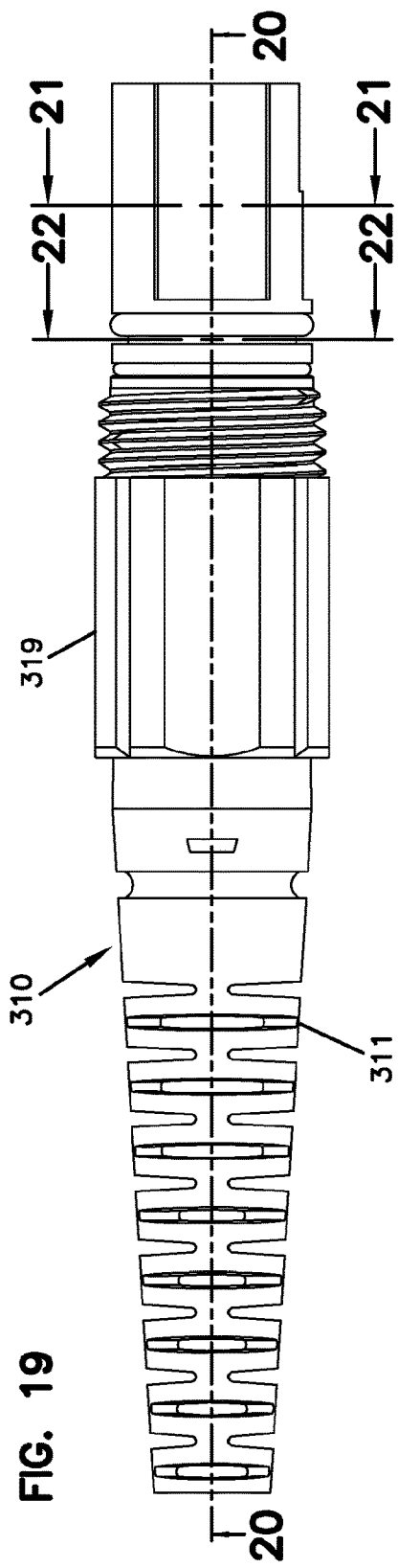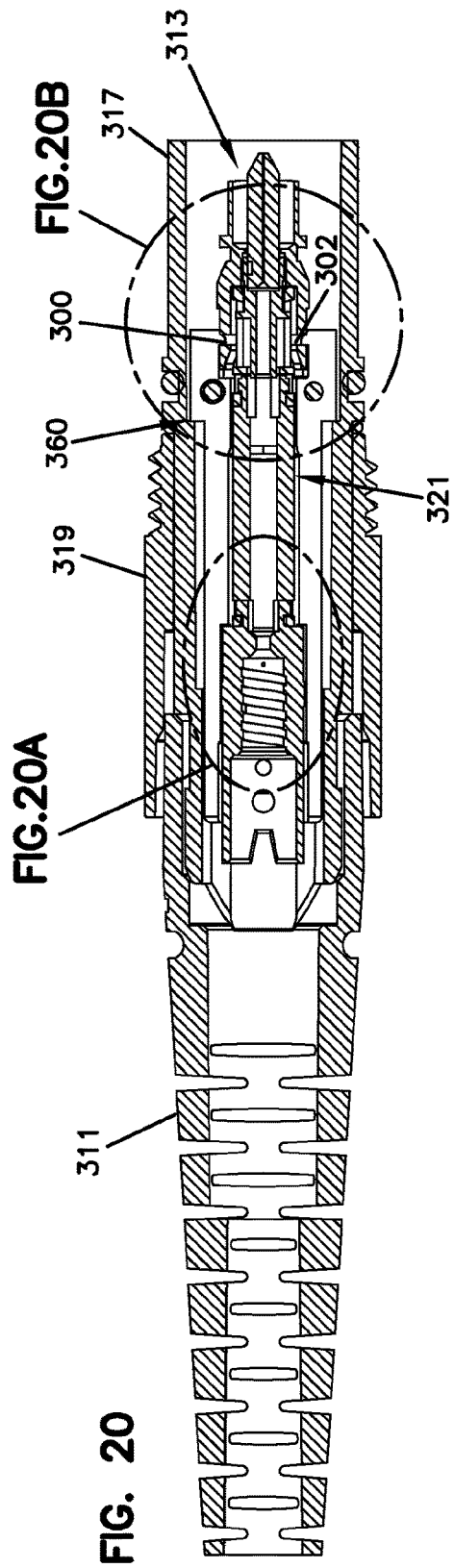

US 10,180,541 B2

HARDENED FIBER OPTIC CONNECTOR WITH PRE-COMPRESSED SPRING

This application is a National Stage Application of PCT/CN2014/094391, filed 19 Dec. 2014, and which application is incorporated herein by reference. To the extent appropriate, a claim of priority is made to the above disclosed application.

TECHNICAL FIELD

The present disclosure relates generally to optical fiber communication systems. More particularly, the present disclosure relates to fiber optic connectors having tuning capabilities.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected together without requiring a splice, and also allow such optical fibers to be easily disconnected from one another. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut or are in close proximity to one another and the ferrules are forced proximally relative to their respective connector housings against the bias of their respective springs. Ideally, the optical fibers of two connected fiber optic connectors are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter (see U.S. Pat. No. 5,317,663, which is hereby incorporated herein by reference) having a sleeve that receives and aligns the respective ferrules supporting the optical fibers desired to be optically coupled together.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by US. Pat. Nos. 7,467,896; 7,744,288 and 8,556,520. Improvements are needed in the areas of ease of assembly, manufacturability and performance.

SUMMARY

Aspects of the present disclosure relate to methods and fiber optic connectors that utilize pre-compressed springs to facilitate fiber optic connector assembly, to enhance fiber optic connector manufacturability, and to control excess fiber length within fiber optic connectors.

Aspects of the present disclosure also relate to a fiber optic connector having a connector core assembly including a spring that is first pre-compressed and held in a pre-compressed state at a first compression step prior to loading within a connector plug body, and that is subjected to a second compression step when the connector core assembly is loaded into the plug body. Pre-compressing the spring facilitates the insertion step, shortens the length of the connector core assembly, and assists in minimizing excess fiber length within the core. The second compression step takes up tolerances in the fiber optic connector and ensures that a hub of a ferrule of the connector core assembly is spring biased against a front portion of the connector plug body.

In one example, the connector core assembly includes a ferrule, a ferrule hub mounted on the ferrule, a spring holder coupled to the ferrule hub by a slidable connection, a spring captured and pre-compressed between the ferrule hub and the spring holder, and an extension body coupled behind the spring holder. The slidable connection allows the ferrule hub and the ferrule to move along a limited/controlled range of movement relative to the spring holder. The ferrule, ferrule hub, spring and spring holder form a ferrule subassembly (i.e., a ferrule unit) that can be pre-assembled prior to insertion in a connector. The pre-assembled ferrule subassembly facilitates connector assembly operations, assists in controlling the amount of fiber length and fiber buckling within the connector and also enables reduction in the overall connector length by reducing the amount of excess fiber length that must be taken up during the assembly process. In certain examples, the connector core assembly includes an extension piece that provides spaced for accommodating fiber buckling when the ferrule of the fiber optic connector is forced rearwardly during coupling to another connector. In certain examples, strength members of a fiber optic cable can be anchored directly or indirectly to the extension piece. In the direct scenario, the extension piece is itself the cable anchor. In the indirect scenario, a separate cable anchor piece can couple to a rear end of the extension piece. The use of separate cable anchor allows different types of cable anchor pieces to be provided to allow the connector core to be customized to accommodate different styles and sizes of fiber optic cables.

Examples of the present disclosure can include splice-on connectors and directly terminated connectors. A splice-on connector includes a pre-processed (e.g., pre-polished, pre-marked for tuning, pre-cleaved, pre-potted, etc.) ferrule having an optical fiber stub that is spliced to the optical fiber of a corresponding fiber optic cable. In a directly terminated connector, the optical fiber of the corresponding fiber optic cable is secured directly within the ferrule of the fiber optic connector and then the ferrule is processed.

Examples of the present disclosure can include hardened fiber optic connectors and hardened fiber optic connection systems. The hardened fiber optic connectors can include sealed interfaces when coupled to corresponding hardened fiber optic adapters. In certain examples, the hardened fiber optic connectors can include optional exterior seals (e.g., annular gaskets). In certain examples, the hardened fiber optic connectors can include robust, fastening elements such as threaded fastening elements (coupling nuts or sleeve shaving internal or external threads), bayonet-style fastening elements or other twist-to-lock fastening elements that can accommodate axial loads greater than 100 pounds. Snap-in-place fastening elements actuated by axial motion are also contemplated.

Examples of the present disclosure can include hardened, tuned fiber optic connectors that may include splice-on ferrules or directly terminated ferrules. In the case of a direct termination connector, a rotational tuning feature can be incorporated into a connector core of the fiber optic connector. The rotational tuning feature can allow a rotational position of the ferrule to be set to a tuned position. In the case of splice-on connectors, tuning can be implemented at the time the ferrule is spliced to the optical fiber of a corresponding fiber optic cable. Tuning provides enhanced performance (e.g., reduced insertion loss).

Examples of the present disclosure can include fiber optic connectors including a ferrule subassembly having a ferrule, a ferrule hub secured to the ferrule, a spring holder coupled to the ferrule hub and a spring captured between the ferrule hub and the spring holder. In certain examples, the ferrule subassembly is configured to facilitate tuning of the fiber optic connector. In certain examples, the ferrule subassembly can be rotated as a unit relative to a cable anchor of the connector to tune the connector. In certain examples, the ferrule subassembly can be mounted in a plurality of different rotational positions about a central axis of the ferrule relative to a cable anchor of the fiber optic connector to provide tuning of the fiber optic connector. In certain examples, an extension piece can be attached between a cable anchor and the ferrule subassembly of the fiber optic connector. In certain example, the ferrule subassembly and the extension piece are part of a connector core that is loaded into a plug body. When loaded, the ferrule hub can mechanically interlock with an internal feature of the plug body to provide enhanced retention of the ferrule in the tuned rotational position. In certain examples, the ferrule hub can be spring biased against an internal shoulder feature within the plug body. In certain examples, a secondary spring compression step is used to absorb assembly tolerances and to ensure that the ferrule hub is firmly biased in contact with the internal shoulder feature within the plug body.

Examples of the present disclosure also include connector cores having extension pieces having slots that extend throughout the lengths of the extension pieces. Such structure allows the extension piece to be installed on the optical fiber and incorporated into the connector core after polishing operations in a direct termination connector and after splicing operations in a splice-on connector. This provides additional available fiber length useful in enhancing compatibility with splicing operations and polishing operations.

Certain teachings of the present disclosure also relate to a method for assembling a fiber optic connector. The fiber optic connector can include a ferrule subassembly including a ferrule, a ferrule hub that attaches to the ferrule, a spring holder and a connector spring. The fiber optic connector can also include a plug body in which the ferrule subassembly mounts. The plug body can define a central longitudinal axis and can have a plug end through which the ferrule extends when the ferrule subassembly is mounted within the plug body. The method can include pre-assembling the ferrule subassembly such that the connector spring is pre-compressed in an initial compressed state between the ferrule hub and the spring holder. The method can also include loading the pre-assembled ferrule subassembly into the plug body and applying a secondary compression force to the connector spring as the pre-assembled ferrule assembly is loaded into the plug body to move the connector spring to a final compressed state. The method further can include securing the ferrule subassembly in axial position relative to the plug body to retain the connector spring in the final compressed state.

Certain teachings of the present disclosure also relate to a fiber optic connector including a plug body having a plug end and a connector core that mounts within the plug body. The connector core includes a ferrule subassembly including a ferrule, a ferrule hub that attaches to the ferrule, a spring holder and a connector spring. The ferrule sub-assembly is assembled with the connector spring pre-compressed to an initial compressed state prior to mounting the connector core within the connector body. The plug body and the core are configured such that the connector spring is moved from the initial compressed state to a final compressed state when the connector core is loaded in the plug body.

Certain teachings of the present disclosure also relate to a fiber optic connector core including a ferrule subassembly and a cable anchor. The ferrule subassembly includes a ferrule supporting an optical fiber along a ferrule axis, a ferrule hub attached to the ferrule, a spring holder that attaches to the ferrule hub and a spring captured between the spring holder and the ferrule hub. The ferrule is non-rotatable about the ferrule axis relative to the ferrule hub and the spring holder. The ferrule subassembly has a plurality of different rotational mounting positions about the ferrule axis relative to the cable anchor. During assembly, tuning is accomplished by securing the ferrule subassembly in a suitable rotational mounting position where a core offset of the optical fiber is oriented at a predetermined rotational position relative to the cable anchor.

Certain aspect of the present disclosure further relate to a tunable hardened fiber optic connector for attachment to a fiber optic cable having at least one strength member. The tunable hardened fiber optic connector includes a connector core including a ferrule supporting an optical fiber, a ferrule hub secured to the ferrule and a cable anchor. The tunable hardened fiber optic connector also includes a plug body that mounts over the connector core. The plug body has a plug end through which the ferrule extends when the plug body is mounted over the connector core such that an end face of the ferrule is accessible adjacent the plug end of the plug body. The tunable hardened fiber optic connector further includes a fastening element mounted outside plug body for securing the tunable hardened fiber optic connector to a mating connector or adapter. The connector core is configured such that the ferrule can be pre-set in one of at least three different rotational tuning positions relative to the cable anchor prior to mounting the plug body over the connector core to tune the hardened fiber optic connector. The pre-set one of the at least three different rotational tuning positions represents a tuned position of the ferrule. The plug end of the plug body defines an internal feature that interfaces with the ferrule hub to rotationally lock the ferrule in the tuned position relative to the plug body.

Aspects of the present disclosure also relate to a fiber optic connector configuration having an interlock between a connector core and a plug body that is configured to cause secondary compression of a ferrule spring during the interlock process. This type of configuration compensates for manufacturing tolerances and ensures ferrule hub properly seats within the plug body.

Aspects of the present disclosure relate to fiber optic connector configurations that reduce ferrule spring length during assembly of the fiber optic connector thereby reducing the length of optical fiber that ultimate should be taken up during the assembly process.

Teachings of the present disclosure relate to features that permit effective tuning of hardened fiber optic connectors to minimize signal losses at optical couplings between the hardened fiber optic connectors.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 4 shows a fiber optic stub of a fiber optic ferrule of the hardened fiber optic connector of FIG. 2 being spliced to an optical fiber of a corresponding fiber optic cable;

FIG. 5 shows the ferrule of FIG. 4 with a hub shell positioned over the splice location;

FIG. 17 is a bottom view of the hardened fiber optic connector of FIG. 12;

FIG. 18 is a cross-sectional view taken along section line 18-18 of FIG. 17;

FIG. 19 is a side view of the hardened fiber optic connector of FIG. 12;

FIG. 20 is a cross-sectional view taken along section line 20-20 of FIG. 19;

DETAILED DESCRIPTION

Figure 1:
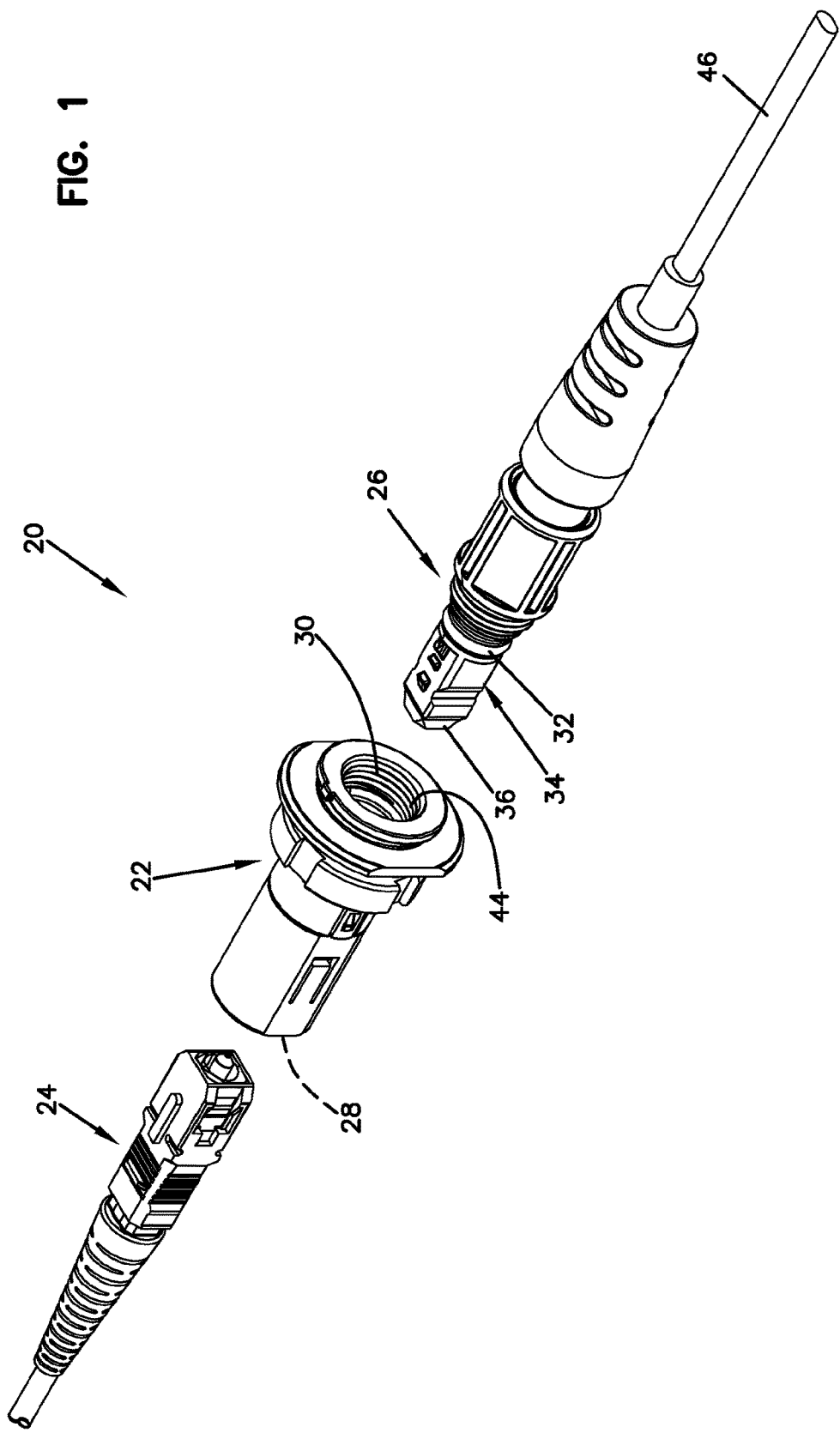
FIG. 1 is a perspective view of a hardened fiber optic connection system in accordance with the principles of the present disclosure.
Figure 2:
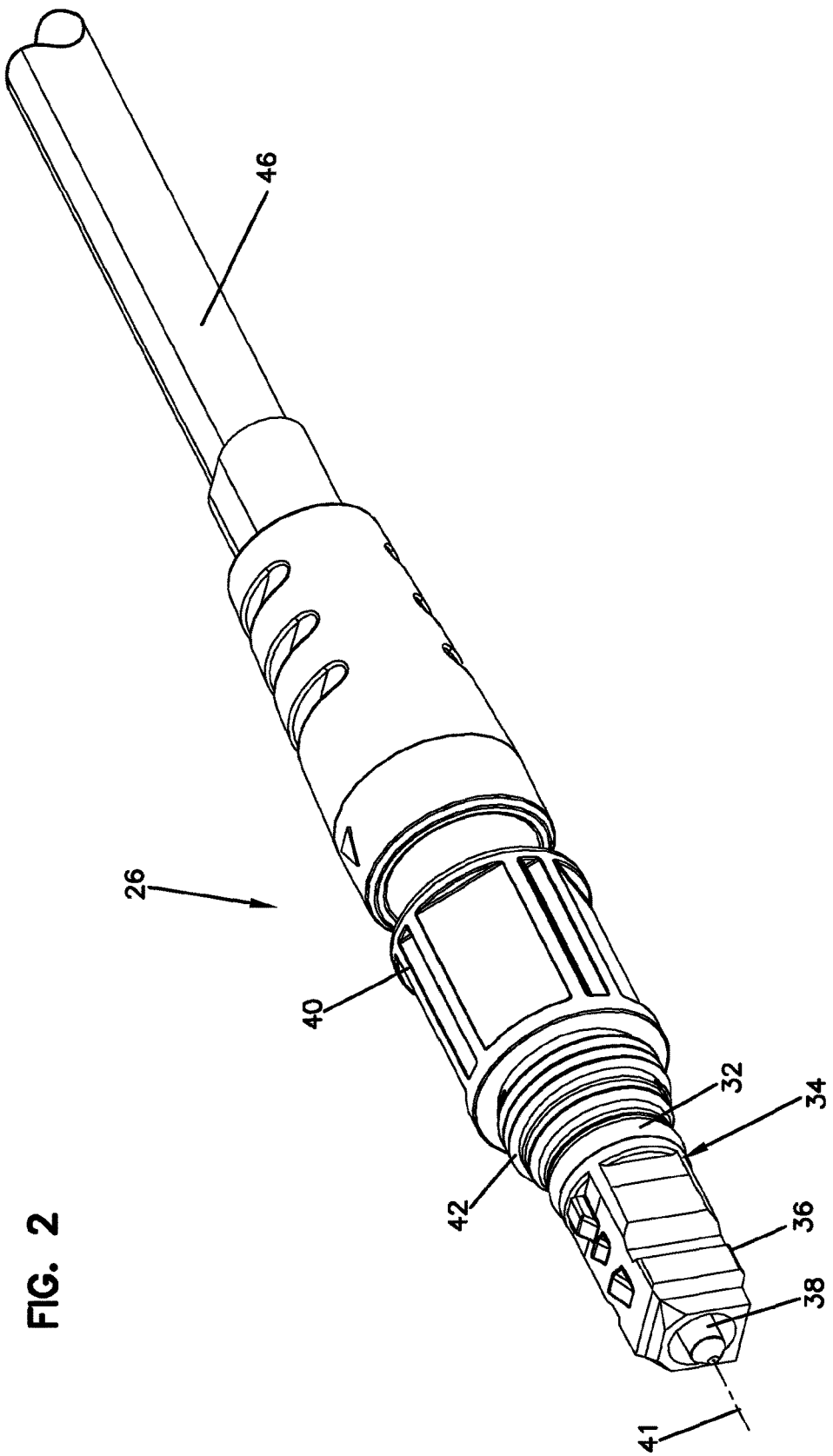
FIG. 2 is a perspective view of a hardened fiber optic connector of the hardened fiber optic connection system of FIG. 1.

FIG. 1 illustrated a hardened fiber optic connection system 20 in accordance with the principles of the present disclosure. The hardened fiber optic connection system 20 includes a fiber optic adapter 22 configured for coupling a non-hardened fiber optic connector 24 (e.g., an SC-type connector) to a hardened fiber optic connector 26. The fiber optic adapter 22 is configured to be mounted in sealed relation relative to a bulk head, panel, wall of an enclosure or other structure. The fiber optic adapter 22 includes a first port 28 for receiving the non-hardened fiber optic connector 24 and an opposite second port 30 for receiving the hardened fiber optic connector 26. When the hardened fiber optic connector 26 is secured within the second port 30, a sealed relationship preferably exists between the hardened fiber optic connector 26 and the fiber optic adapter 22. For example, the hardened fiber optic connector 26 can include a seal 32 that forms a radial seal within the second port 30. Additionally, the hardened fiber optic connector 26 can include a plug body 34 having a plug end 36 that is received within the second port 30. As shown at FIG. 2, the hardened fiber optic connector 26 can include a ferrule 38 that is accessible at the plug end 36. The plug end 36 can include a keying structure (e.g., a rail, tab, flat, non-symmetrical characteristic, etc.) that mates with a corresponding keying structure within the second port 30 to ensure that the plug end 36 is inserted into the second port 30 at a particular rotational orientation. The hardened fiber optic connector 26 can also include a fastening element 40 for securing the hardened fiber optic connector 26 within the second port 30. In certain examples, the fastening element 40 can have a robust configuration capable of withstanding axial loads in excess of 100 pounds. In certain examples, the fastening element 40 is rotatable relative to the plug body 34 and includes threads 42 that mate with corresponding threads 44 of the second port 30.

As indicated above, the fastening element 40 of the hardened fiber optic connector has a robust configuration for mechanically coupling the hardened fiber optic connector 26 to the fiber optic adapter 22. In certain examples, the fastening element 40 is free to rotate about a central longitudinal axis of the hardened fiber optic connector 26. In the depicted example, the fastening element 40 includes a coupling nut having external threads adapted to engage internal threads of the mating fiber optic adapter 22. In other examples, the fastening element can include a coupling sleeve having internal threads that engage corresponding external threads of the mating fiber optic adapter. In still other examples, the robust coupling can be provided by a bayonet-style coupling arrangement between the fastening element and the mating fiber optic adapter. It will further be appreciated that the interface between the hardened fiber optic connector 26 and its mating fiber optic adapter 22 is preferably environmentally sealed by a sealing arrangement configured to limit or prevent the intrusion of moisture, dust or other contaminants. The sealing arrangement can include one or more sealing members (e.g., O-rings, radial seals, face seals, or other gasket-type seals mounted on the plug body 34, on a shroud surrounding the plug body, or on/in the fiber optic adapter).

Figure 3:
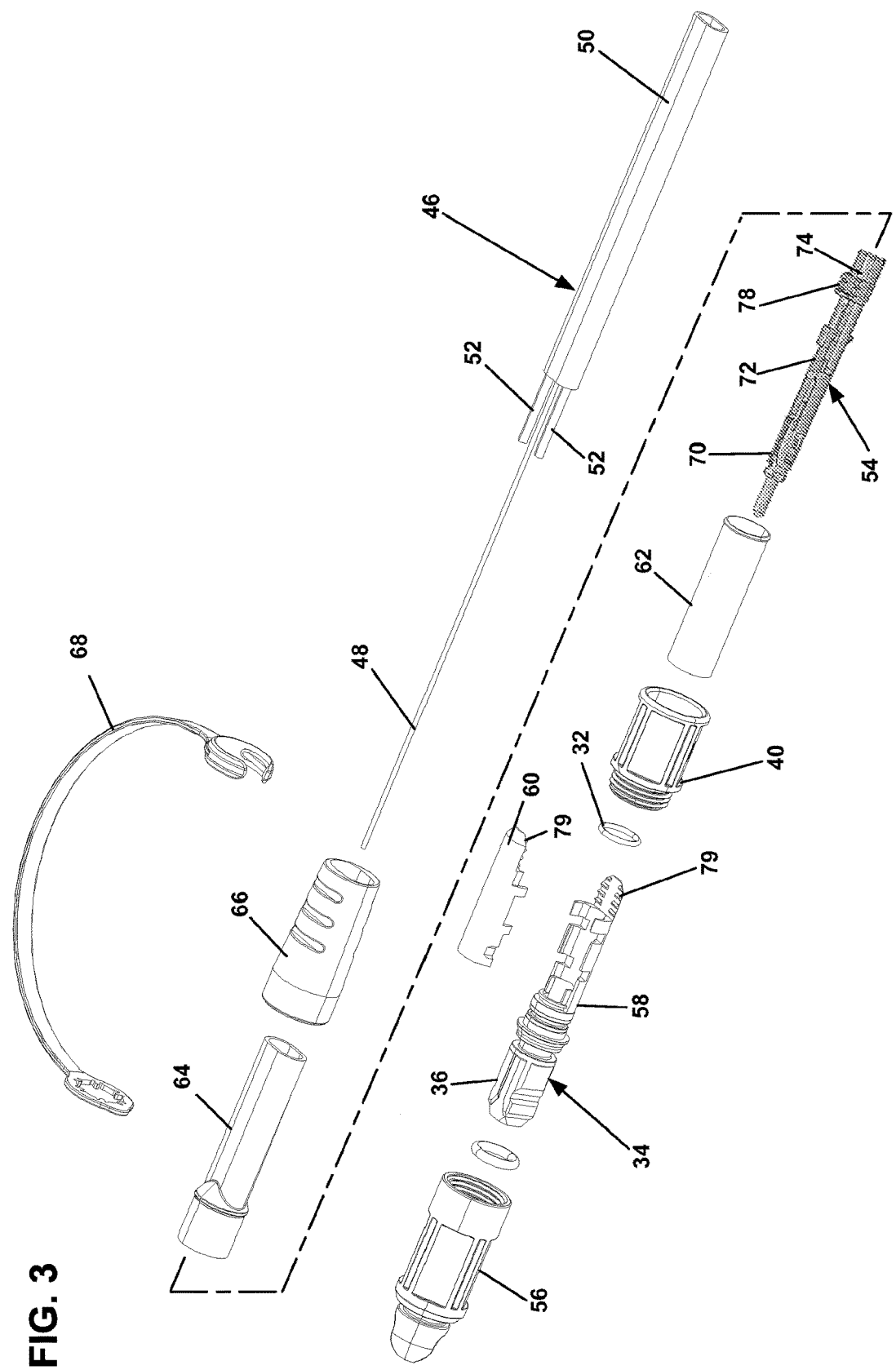
FIG. 3 is a an exploded view of the hardened fiber optic connector of FIG. 2.

Referring to FIG. 3, the hardened fiber optic connector 26 is configured to terminate a fiber optic cable 46. As shown at FIG. 3, the fiber optic cable includes an optical fiber 48 protected within a jacket 50. In certain examples, the jacket 50 can have an elongated transverse cross-section so as to have a generally "flat" configuration. The fiber optic cable 46 can also include one or more strength elements 52. In the depicted example, the strength elements 52 are positioned on opposite sides of the optical fiber 48. In certain examples, strength elements 52 can include aramid yarn, rods made of fiber reinforced epoxy or other materials, metal members strands or braids, or other structures.

Referring still to FIG. 3, the hardened fiber optic connector 26 includes a connector core 54 that mounts within the plug body 34. The hardened fiber optic connector 26 can also include a dust cap 56 that can be secured over the plug end 36 of the plug body 34 by the fastening element 40 to provide protection of the ferrule 38 when the hardened fiber optic connector 26 is not in use. The plug body 34 can include a main body 58 and a side cover 60. The hardened fiber optic connector 26 further can include a metal sleeve 62 for reinforcing the plug body 34, a shape memory sleeve 64 (e.g., a heat shrink sleeve) for providing a seal between the cable jacket 50 and the hardened fiber optic connector 26, a boot 66 for providing strain relief and bend radius protection at the interface between the fiber optic cable 46 and the back end of the hardened fiber optic connector 26, and a lanyard 68 for tethering the dust cap 56 to the hardened fiber optic connector 26.

The connector core 54 of the hardened fiber optic connector 26 includes a ferrule subassembly 70, an extension piece 72 and a cable anchor 74. In certain examples, the extension piece 72 can be mounted between the ferrule subassembly 70 and the cable anchor 74. In one example, the ferrule subassembly 70 attaches to a front end of the extension piece 72 by a mechanical interface such as a snap-fit connection. It will be appreciated that the fiber optic cable 46 can be secured to the cable anchor 74. In certain examples, the strength elements 52 and the jacket 50 can be adhesively secured within the cable anchor 74. The cable anchor 74 can include interlock structures 78 (e.g., teeth, tabs, ribs, etc.) that interlock with mating structures 79 on the plug body 34 to assist in axially fixing the cable anchor 74 relative to the plug body 34. In certain examples, the cable anchor 74 can connect to a rear end of the extension piece 72 by a snap-fit connection or other type of mechanical interface.

Figure 6:
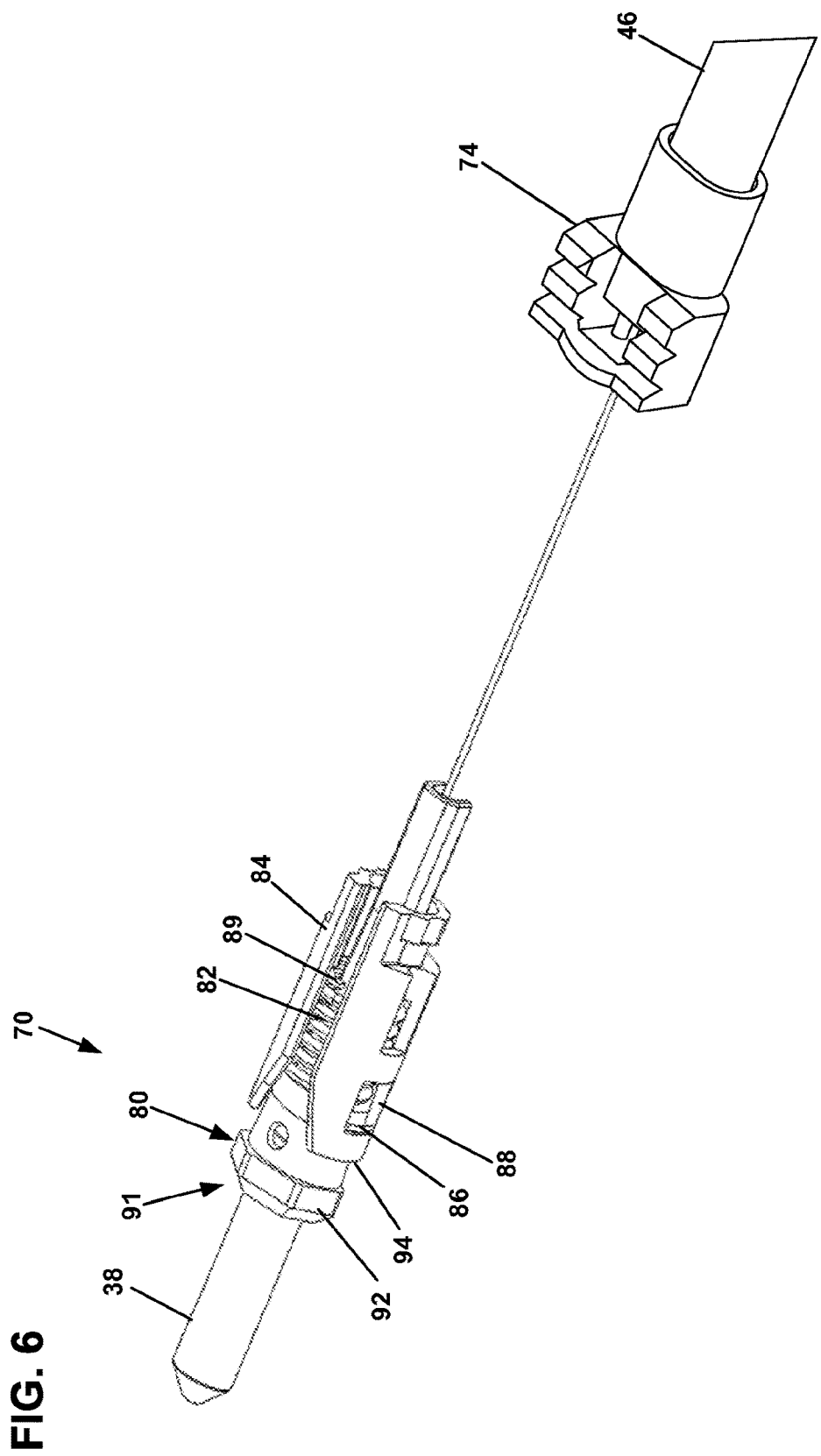
FIG. 6 shows a ferrule subassembly of the hardened fiber optic connector of FIG. 2, the ferrule subassembly includes a ferrule, a ferrule hub, a spring and a spring holder.

Referring to FIG. 6, the ferrule subassembly 70 of the connector core 54 includes the ferrule 38, a ferrule hub 80 coupled to the ferrule 38, a ferrule spring 82 and a spring retainer 84. In certain examples, the spring retainer 84 is configured to couple to the ferrule hub 80 such that the ferrule spring 82 is captured between the spring retainer 84 and the ferrule hub 80. For example, the ferrule hub 80 can include tabs 86 that fit within corresponding openings 88 defined by the spring retainer 84. In certain examples, the tabs 86 fit within the openings 88 by a snap-fit connection. In certain examples, the spring retainer 84 can include an open through-slot 89 that extends through the length of the spring retainer 84 and allows the spring retainer 84 to flex open to allow the tabs 86 to snap-fit within the openings 88. The spring retainer 84 is configured to allow the ferrule spring 82 to be pre-compressed in an initial compressed state between the ferrule hub 80 and the spring retainer 84 (i.e., the spring holder). In this way, the ferrule spring 82 can be pre-compressed prior to loading the connector core 54 into the plug body 34. In the initial compressed state, the ferrule spring 82 is shorter than in the non-compressed state thereby allowing the pre-assembled ferrule subassembly 70 to be shorter. As described herein, shortening of the ferrule subassembly 70 by pre-compressing the ferrule spring 82 reduces the amount of excess fiber that must be pulled from the connector during the assembly process.

The ferrule 38 and the corresponding ferrule hub 80 move together as a unit relative to the spring retainer 84. The ferrule 38 and the ferrune hub 80 can be referred to as a ferrule unit 91. The ferrule spring 82 biases the ferrule unit 91 in a forward direction relative to the spring retainer 84. The connection between the spring retainer 84 and the ferrule hub 80 limits the range of axial movement that is permissible between the ferrule unit 91 (i.e., the ferrule 38 and its corresponding ferrule hub 80) and the spring retainer 84. By precisely limiting the range of seal movement of the ferrule unit 91 relative to the spring retainer 84, fiber buckling in the hardened fiber optic connector 26 can be precisely predicted, limited and controlled. In certain examples, rearward movement of the ferrule unit relative to the spring retainer 84 is limited by interference between the tabs 86 and rear ends of the openings 88. In other examples, rearward movement of the ferrule unit relative to the spring retainer 84 can be limited by contact between a front flange 92 of the ferrule hub 80 and a forward end 94 of the spring retainer 84.

In certain examples, the cable anchor 74 can be integrated directly into the extension piece 72 thereby allowing the strength elements 52 to be coupled directly to the extension piece 72 without an intermediate cable anchor piece.

In certain examples, the spring retainer 84 is coupled to the ferrule hub 80 by a connection that allows the ferrule unit 91 to slide axially relative to the spring retainer 84 along a limited range of movement defined between first and second axial positions. The ferrule spring 82 biases the ferrule unit toward the first axial position. The coupling between the ferrule hub 80 and the spring retainer 84 can provide a positive stop that stops forward movement of the ferrule unit 91 relative to the spring retainer 84 at the first axial position. The coupling between the ferrule hub 80 and the spring retainer 84 can also provide a positive stop that stops rearward movement of the ferrule unit relative to the spring retainer 84 at the second axial position. In certain examples, the ferrule unit is rotationally keyed relative to the spring retainer 84 such that relative rotation between the ferrule unit and the spring retainer 84 is prevented. In one example, the first positive stop can be provided by contact between the tabs 86 and forward ends of the openings 88. In certain examples, the second positive stop can be provided by contact between the front flange 92 of the ferrule hub 80 and the forward end 94 of the spring retainer 84.

Referring to FIGS. 4 and 5, the ferrule 38 includes a front face 96 that can be polished. An optical fiber stub 98 is secured within a longitudinal bore of the ferrule 38. The optical fiber stub 98 has a front end 100 positioned at the front face 96 of the ferrule 38 and a rear end portion 102 that projects rearwardly from a rear end of the ferrule 38. The rear end portion 102 of the optical fiber stub 98 can be spliced to the optical fiber 48 of the fiber optic cable 46 at a splice location 104. The splice location 104 can be protected within the ferrule hub 80. In certain examples, the ferrule hub 80 can include the front flange 92 that is secured to the ferrule 38 prior to splicing, and a rear hub portion 106 that can be secured to the rear end of the ferrule 38 after splicing. The rear hub portion 106 can include an outer shell 108 that abuts against a back side of the front flange 92. The outer shell 108 can include a longitudinal slot 110 that allows the outer shell 108 to be inserted over the splice location 104 after splicing. The outer shell 108 can define a port 112 for allowing a splice encapsulating material 113 such as adhesive to be injected into the interior of the outer shell 108 to encapsulate and protect the splice location 104. The tabs 86 for mechanically interfacing with the spring retainer 84 can be provided on the outer shell 108.

The front flange 92 can be configured to mate with the interior of the plug body 34 so as to prevent relative rotation between the ferrule hub 80 and the plug body 34. For example, the front flange 92 can include a plurality of flats 114 that oppose corresponding flats defined within the interior of the plug body 34 so as to prevent relative rotation between the ferrule hub 80 and the plug body 34. Additionally, the front flange 92 can include front angled surfaces 116 that preferably seat against corresponding surfaces defined within the plug end 36 of the plug body 34 when the connector core 54 is loaded therein.

In certain examples, the optical fiber 48 is fixed relative to the hardened fiber optic connector 26 by adhesive at the cable anchor 74. Thus, when the ferrule 38 is pushed back relative to the plug body 34 when engaging the mating non-hardened fiber optic connector 24 within the fiber optic adapter 22, the optical fiber 48 is prevented from pushing back into the fiber optic cable 46. Thus, when the hardened fiber optic connector 26 is connected with another connector, space should be provided within the hardened fiber optic connector 26 to accommodate the associated fiber buckling that occurs. In the depicted example, this fiber buckling space is provided by the extension piece 72. The extension piece 72 is elongated and extends a majority of the length of the plug body 34. Sufficient interior space is provided within the extension piece 72 to accommodate buckling associated with the rearward movement of the ferrule 38 against the bias of the ferrule spring 82 during connector coupling. As indicated previously, the ferrule subassembly 70 is configured to precisely control the range of movement of the ferrule 38 and provides positive stops for preventing the ferrule 38 from being moved rearwardly beyond a predetermined limit. Therefore, the degree of buckling that is to be accommodated within the extension piece 72 is predetermined and controlled.

The extension piece 72 also includes a mechanical interlock feature 120 (see FIG. 7) adapted to interlock or otherwise mechanically engage with the plug body 34. In the depicted example, the interlock feature 120 includes a tab that fits within a corresponding opening 122 defined by the plug body 34 (see FIG. 9).

During assembly of the hardened fiber optic connector 26, it will be appreciated that the connector core 54 is preassembled prior to insertion within the plug body 34. As part of the preassembly process, the ferrule subassembly 70 is preassembled and the ferrule spring 82 is pre-compressed and retained in the initial compressed state by the spring retainer 84. When the connector core 54 is loaded into the plug body 34, the front angled surfaces 116 of the ferrule hub 80 abut against the corresponding surfaces provided within the plug end 36 of the plug body 34 and a secondary compression force is applied to the ferrule spring 82 as the connector core 54 is loaded into the plug body 34. This secondary compression force is sufficient to move the ferrule spring 82 from the initial compressed state to a final compressed state. In the final compressed state, the front angled surfaces 116 are biased firmly against the corresponding angled surfaces at the plug end 36 of the plug body 34, and the ferrule unit is forced slightly rearwardly with respect to the forward positive stop position defined by the mechanical interface between the ferrule hub 80 and the spring retainer 84. This secondary compression step assures that the front angled surfaces 116 are properly seated against the plug end 36 of the plug body 34, and that any tolerances in the manufacturing process have been taken up. The interlock feature 120 and the corresponding opening 122 are relatively positioned such that the mechanical interlock fixes the connector core 54 in the appropriate axial position relative to the plug body 34 where the ferrule spring 82 is secured and retained in the final compressed state. It will be appreciated that the plug body 34 generally defines the central longitudinal axis 41, and that axial movement referred to herein is made with reference to such a central longitudinal axis 41.

To assemble the hardened fiber optic connector 26, the fiber optic cable 46 is initially prepared using stripping, cleaving and cleaning operations. As so prepared, an end portion of the jacket 50 is removed to expose the optical fiber 48 and end portions of the strength elements 52. After preparation of the fiber optic cable 46, the cable anchor 74 and the ferrule spring 82 can be inserted over the optical fiber 48 and the optical fiber 48 can be fusion spliced to the optical fiber stub 98 of the ferrule 38 at the splice location 104 (see FIG. 4). After splicing, the outer shell 108 of the ferrule hub 80 can be laterally inserted over the splice location 104 and filled with adhesive or other encapsulating material 113 that encapsulates and protects the splice location 104 (see FIG. 5). The ferrule subassembly 70 is then assembled by sliding the ferrule spring 82 forwardly into engagement with the ferrule hub 80 and inserting the spring retainer 84 laterally over the spliced optical fiber stub 98 and optical fiber 48 via the through-slot 89 at a location behind the ferrule spring 82. The spring retainer 84 is then slid forwardly over the rear hub portion 106 causing the ferrule spring 82 to be axially compressed between the spring retainer 84 and the ferrule hub 80. As previously indicated, the pre-compression of the ferrule spring 82 causes the ferrule spring 82 to be shortened and retained in an initial compressed state. The spring retainer 84 is moved forwardly until the tabs 86 of the ferrule hub 80 snap within the openings 88 of the spring retainer 84 such that the spring retainer 84 is effectively coupled to the ferrule hub 80. In this way, the ferrule spring 82 is captured and retained in the initial compressed state by the spring retainer 84 via its coupling to the ferrule hub 80. FIG. 6 shows the preassembled ferrule subassembly 70.

Figure 7:
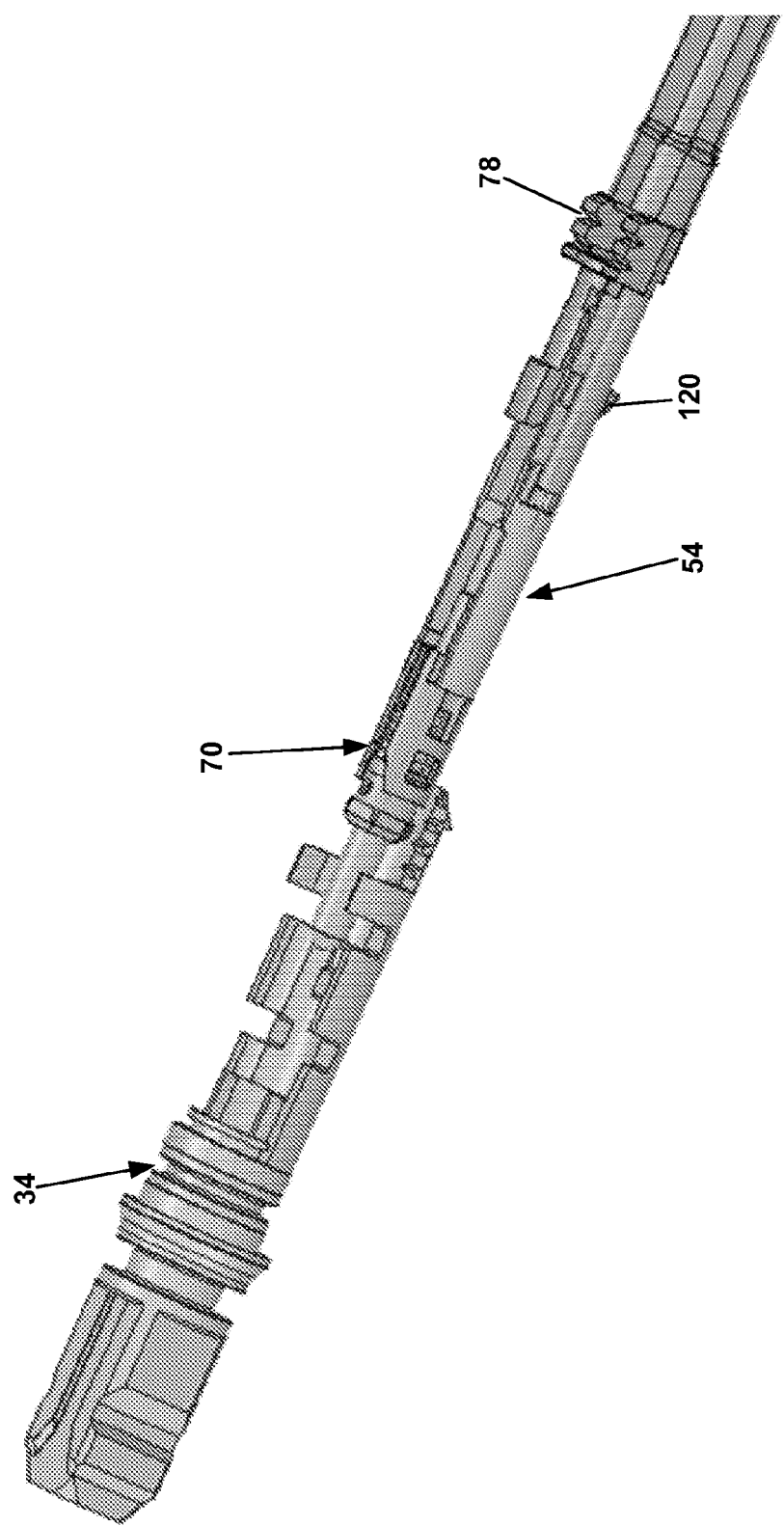
FIG. 7 illustrates a connector core and plug body of the hardened fiber optic connector of FIG. 2.
Figure 8:
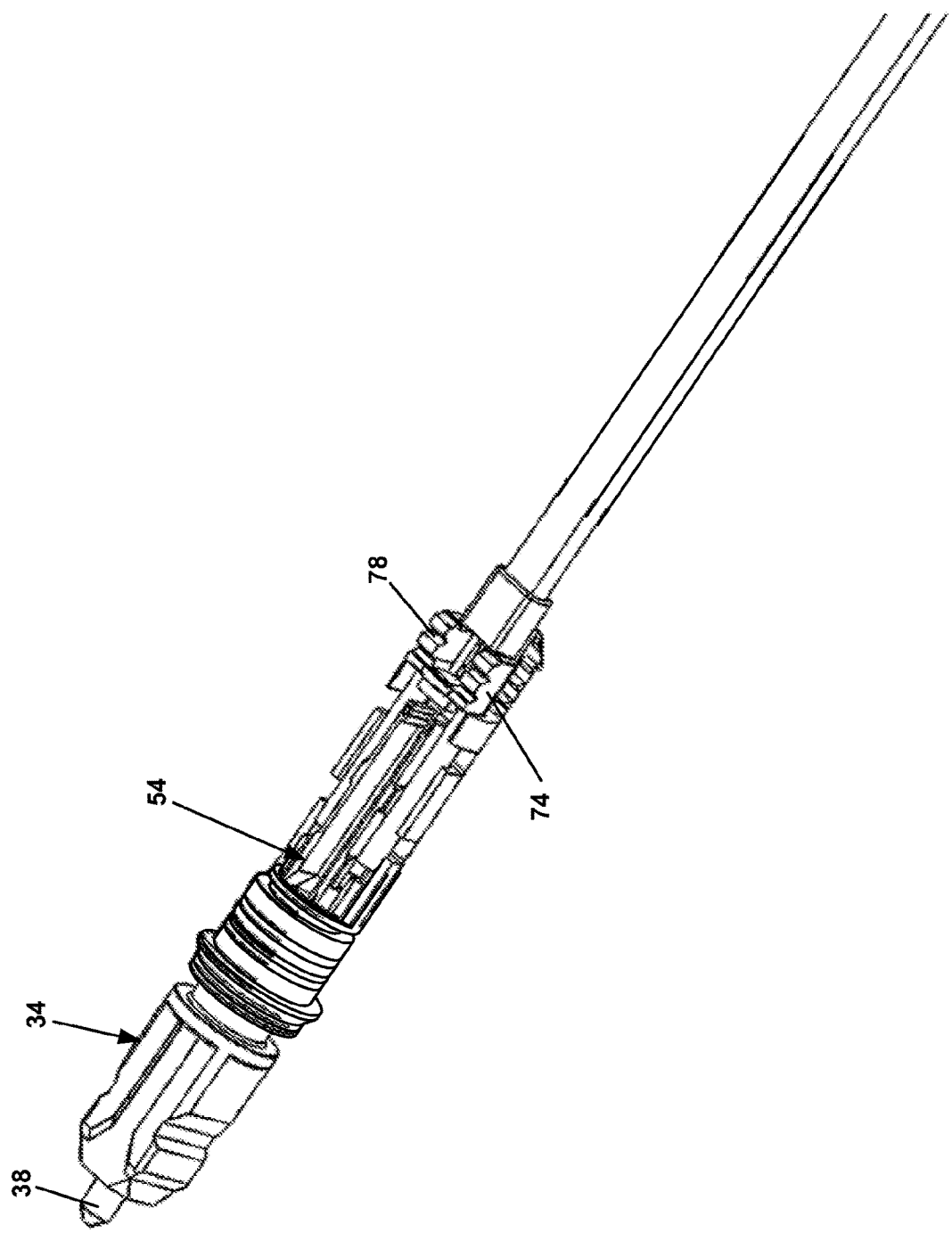
FIG. 8 shows the connector core of FIG. 7 fully inserted within the plug body.
Figure 9:
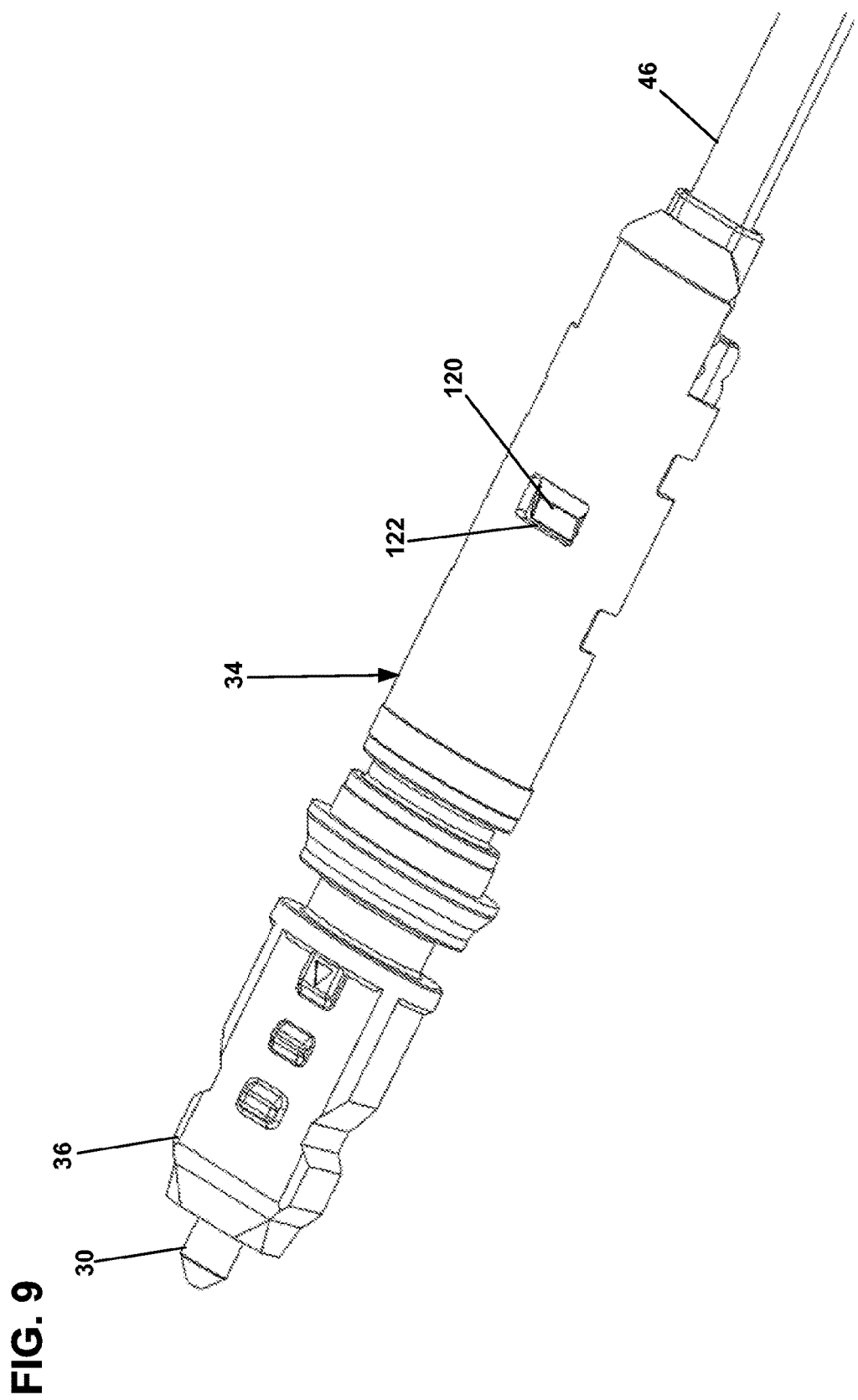
FIG. 9 is another view showing the connector core of FIG. 7 fully inserted within the plug body.
Figure 10:
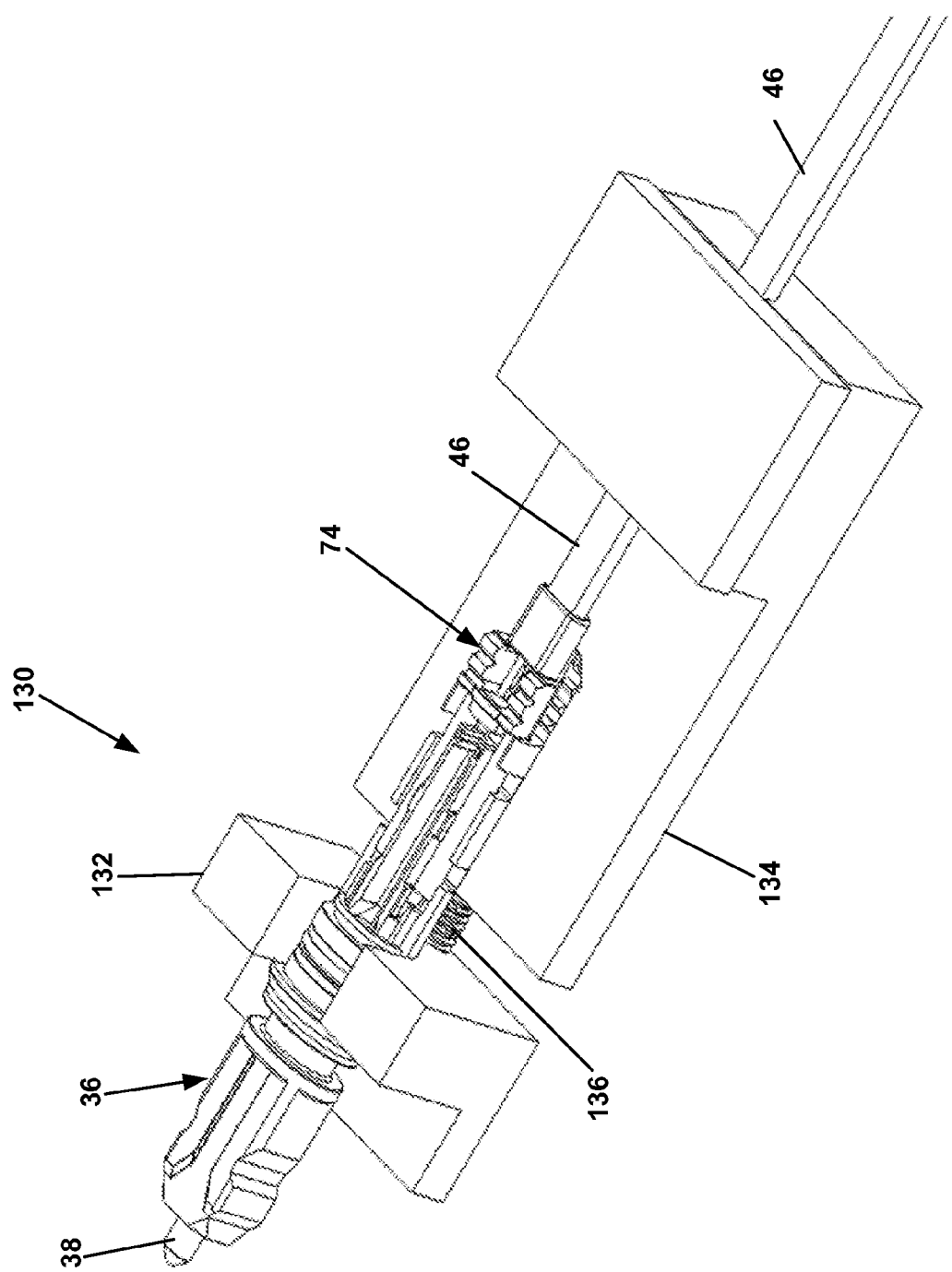
FIG. 10 shows a fixture used to assist in assembling the hardened fiber optic connector of FIG. 2.

After preassembling the ferrule subassembly 70, the extension piece 72 is installed between the spring retainer 84 and the cable anchor 74. In certain examples, snap-fit connections can be provided between the spring retainer 84 and the front end of the extension piece 72 and between the cable anchor 74 and the rear end of the extension piece 72. FIG. 7 shows the pre-assembled connector core 54 prior to insertion within the plug body 34. After the connector core 54 has been preassembled, the connector core is inserted axially into the plug body 34 as shown at FIG. 7. The connector core 54 is inserted axially into the plug body 34 until the front angled surfaces 116 at the front side of the ferrule hub 80 engage a stop structure at the inside of the plug end 36 of the plug body 34 and sufficient axial pressure is applied to the connector core 54 to move the ferrule spring 82 from the initial compressed state to a final compressed state. It will be appreciated that the interlock feature 120 of the connector core 54 snaps within the opening 122 of the plug body 34 when the connector core 54 has been inserted sufficiently within the plug body 34 for the ferrule spring 82 to move from the initial compressed state to the final compressed state. Thus, the interlock feature 120 and the opening 122 function to secure the connector core 54 and its corresponding ferrule subassembly 70 in an axial position relative to the plug body 34 where the ferrule spring 82 is retained in the final compressed state. FIGS. 8 and 9 show the connector core 54 fully loaded within the plug body 34.

Once the connector core 54 has been loaded within the plug body 34, the assembly can be loaded into a fixture 130 having a first portion 132 that engages a forward portion of the plug body 34 and a second portion 134 that can attach (e.g., clamp) to the fiber optic cable 46. A spring 136 can be provided between the first and second portions 132, 134 to exert a biasing force on the second portion 134 that biases the second portion 134 in a rearward direction relative to the first portion 132. In this way, the fiber optic cable 46 is pulled rearwardly relative to the plug body 34 to cause any excess fiber length within the connector core 54 to be taken up. In certain examples, the spring 136 has a spring force that is equal to or less than a corresponding spring force of the ferrule spring 82. In this way, further compressive load is not applied to the ferrule spring 82 which would cause the ferrule spring 82 to apply tension to the optical fiber 48. Once any slack optical fiber has been straightened within the connector core 54, adhesive material such as epoxy can be injected into the cable anchor 74 to secure the strength elements 52 and thus the fiber optic cable 46 at the set axial position relative to the plug body 34 where excess fiber length is not provided within the connector core 54. After curing of the adhesive, the assembly can be removed from the fixture 130 and the remainder of the assembly process can take place. For example, side cover 60 of the plug body 34 can be installed on the main body 58 of the plug body 34. Also, the shape memory sleeve 64 can be slid over the rear portion of the plug body 34, the heat shrink can be applied over the interface between the hardened fiber optic connector 26 and the fiber optic cable 46, the fastening element 40 can be slid over the metal sleeve 62 and the boot 66 can be installed at the rear of the plug body 34. It will be appreciated that prior to the splicing step, components such as the boot 66, the shape memory sleeve 64, and metal sleeve 62 and the fastening element 40 can be slid over the fiber optic cable 46.

A typical single fiber optical connector includes a ferrule having an outer cylindrical surface that functions as a reference surface when the ferrule is received within an alignment sleeve of a fiber optic adapter. The ferrule also defines a central axial passageway in which the optical fiber is secured. Ideally, the optical fiber is secured in the central axial passageway with the fiber core perfectly concentric with the outer cylindrical surface of the ferrule. However, due to manufacturing tolerances, the fiber core is not typically perfectly concentric with the outer cylindrical surface. This is because, among other things, the ferrule passageway may not be concentric with the ferrule outer cylindrical surface, the optical fiber may not be centered in the ferrule passageway, and the fiber core may not be centered within the fiber cladding that defines an outer surface of the optical fiber. This lack of concentricity between the fiber core and the ferrule outer cylindrical surface causes fiber core eccentricity. Fiber core eccentricity can be defined as the distance between the central longitudinal axis of the fiber core (i.e., the fiber core axis) and the central longitudinal axis defined by the ferrule outer cylindrical surface (i.e., the ferrule axis). The direction that the fiber core axis is offset from the ferrule axis can be referred to as the direction of core eccentricity.

Figure 11:
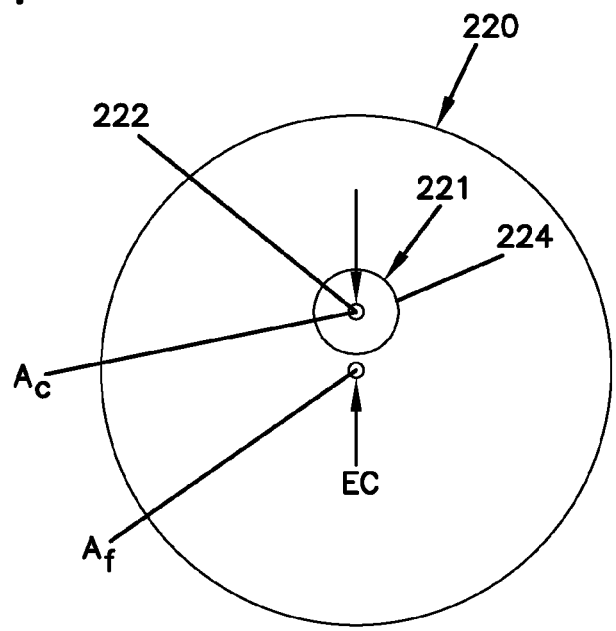
FIG. 11 is a schematic depiction of an end face of a ferrule showing a fiber core offset.

FIG. 11 shows an end view of a ferrule 220 holding an optical fiber 221 having a fiber core 222 and a cladding 224. The cladding 224 typically has a different index of refraction as compared to the fiber core 222 so that light transmitted through the optical fiber 221 can be contained generally within the fiber core 222 by total internal reflection. The fiber core 222 is not centered relative to an outer cylindrical surface of the ferrule 220. Rather, a fiber core axis $A_C$ of the fiber core 222 is offset from a central longitudinal axis $A_F$ of the ferrule 220. In the example shown, the fiber core axis $A_C$ is offset upwardly relative to the outer cylindrical surface of the ferrule 220. In other examples, the fiber core axis $A_C$ can be offset in any other direction relative to the outer cylindrical surface of the ferrule 220. The distance EC by which the fiber core axis $A_C$ is offset from the central longitudinal axis $A_F$ of the ferrule 220 corresponds to the fiber core eccentricity and is exaggerated for the purpose of illustration. Other fiber core eccentricities can occur due to the fiber being offset within the opening of the ferrule, even if it is centrally located in the ferrule, and/or if the core is not concentric with the cladding of the fiber.

Due to fiber core eccentricity, signal losses within a system can occur at the connection between two optical fibers. This is because fiber core eccentricity prevents the fiber cores of the optical fibers being optically coupled together from being perfectly co-axially aligned. The worst-case scenario occurs when the ferrules of two fiber optic connectors being coupled together have directions of core eccentricity that are 180 degrees out of phase with respect to each other. To minimize the negative effect of fiber core eccentricity with respect to signal loss, it is desirable to position the directions of core eccentricity of the ferrules of fiber optic connectors being coupled together in the same rotational orientation. This can be accomplished by "tuning" fiber optic connectors during manufacturing such that the direction of core eccentricity is the same for all of the fiber optic connectors. Tuning typically involves rotating the ferrule to intentionally position the direction of core eccentricity of the ferrule at a particular rotational orientation relative to one or more keyed components of the fiber optic connector. Example tuning techniques are disclosed at PCT Publication No. WO 02/052310 and at U.S. Pat. No. 5,212, 752, which are hereby incorporated by reference.

It will be appreciated that the hardened fiber optic connector 26 is depicted as a splice-on fiber optic connector. As previously described, the ferrule 38 supports the optical fiber stub 98 that is spliced to the optical fiber 48 of the fiber optic cable 46. Prior to splicing, the front end 100 of the optical fiber stub 98 as well as the front face 96 of the ferrule 38 can be pre-processed using processing techniques such as polishing, cleaving, shaping, laser processing or other processing techniques. Additionally, prior to splicing, a direction of core eccentricity of the optical fiber stub 98 relative to the ferrule 38 can be determined and marked on the ferrule 38 or the front flange 92 of the ferrule hub. Thus, at the time of splicing, the direction of core eccentricity of the ferrule assembly can be taken into consideration. For example, tuning can be accomplished by orienting the direction of core eccentricity at a particular rotational orientation relative to the fiber optic cable 46 prior to splicing. The direction of core eccentricity can also be oriented at a particular orientation relative to the plug body 34 prior to splicing. In this way, after splicing, the hardened fiber optic connector 26 is tuned such that the core offset is oriented in a desired rotational orientation about the central longitudinal axis of the ferrule 38.

Figure 14:
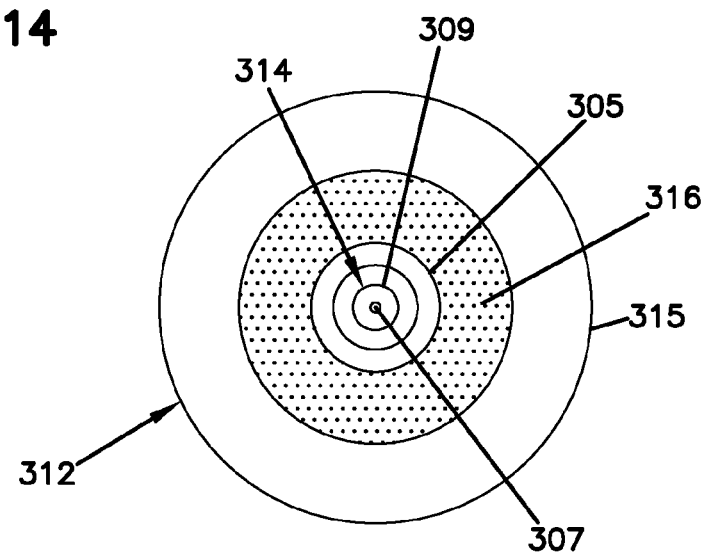
FIG. 14 is a transverse cross-sectional view of an example fiber optic cable that can be terminated by the hardened fiber optic connector of FIG. 12.
Figure 12:
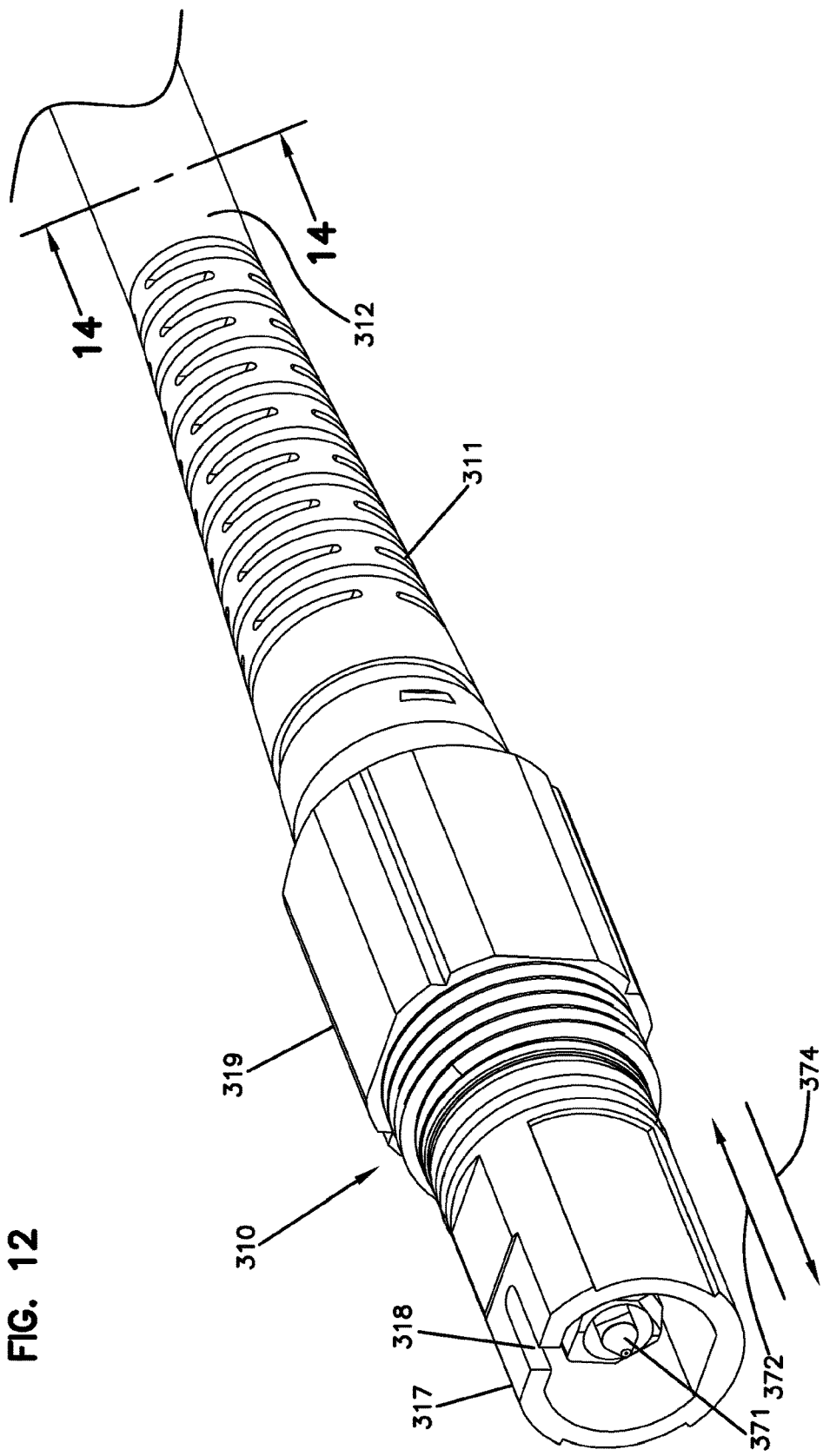
FIG. 12 illustrates another hardened fiber optic connector in accordance with the principles of the present disclosure.
Figure 13:
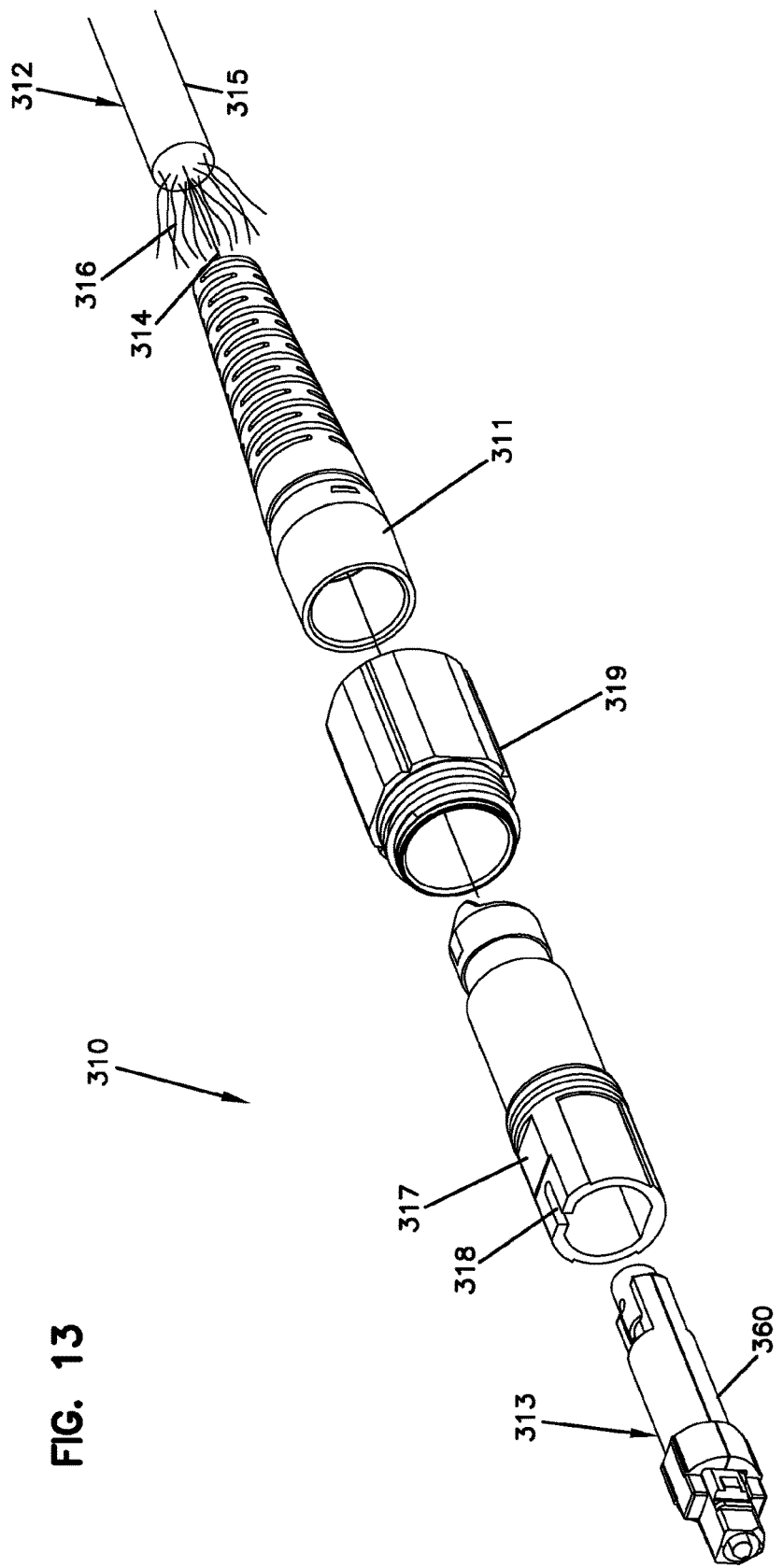
FIG. 13 is a partially exploded view of the hardened fiber optic connector of FIG. 12.

FIGS. 12 and 13 depict another hardened fiber optic connector 310 in accordance with the principles of the present disclosure. The hardened fiber optic connector 310 is shown terminating a fiber optic cable 312 having an optical fiber 314 and strength members 316 surrounded by a jacket 315. As shown at FIG. 14, the optical fiber 314 can include a core 307 surrounded by a cladding layer 309. A loose or tight buffer 305 can be provided between the optical fiber 314 and the strength members 316. The hardened fiber optic connector 310 includes a strain relief boot 311 that extends over the fiber optic cable 312. The strain relief boot 311 couples to an outer shroud 317 disposed about an inner arrangement 313 (FIG. 13) including a tunable connector core 321 (see FIGS. 16, 18, 20 and 24) that mounts within a plug body 360. A robust fastening element 319 mounts over the shroud 317 and can be rotated relative to the outer shroud 317 about a central longitudinal axis of the hardened fiber optic connector 310. In one example, the hardened fiber optic connector 310 directly terminates the optical fiber 314 of the fiber optic cable 312 without any intermediate splices. A tuning feature is integrated into the tunable connector core 321 to allow the hardened fiber optic connector 310 to be readily tuned (i.e., the fiber core eccentricity of the ferrule can be set at a desired rotational orientation relative to a keyed component of the connector such as the shroud, the plug body or both) after mounting on the optical fiber 314 to provide enhanced performance (e.g., low insertion loss).

Figure 15:
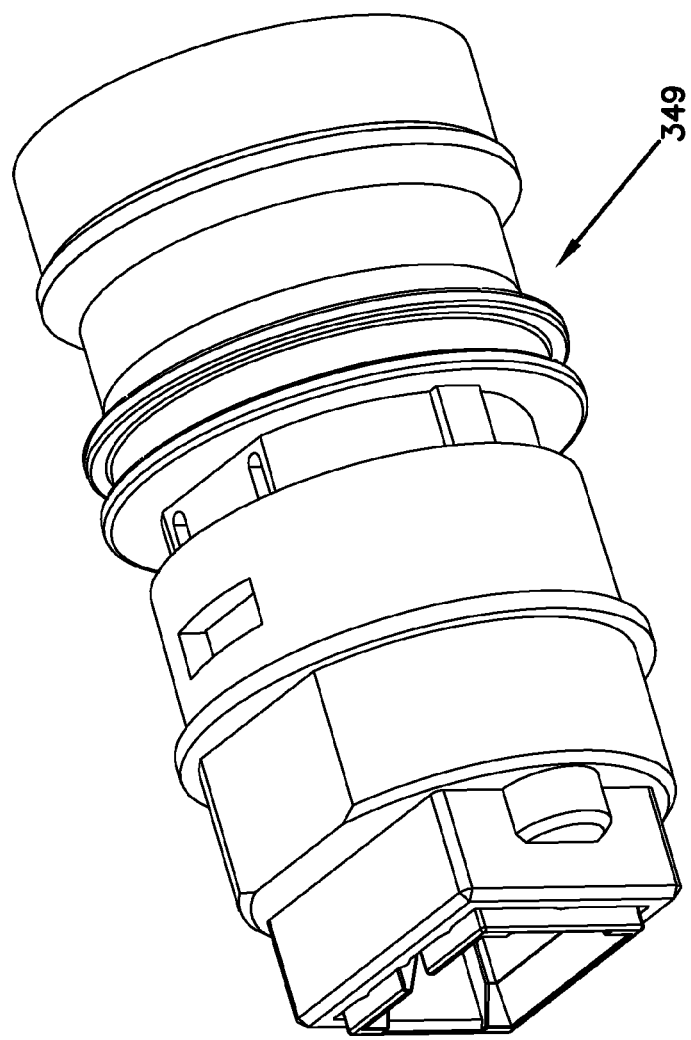
FIG. 15 illustrates an example hardened fiber optic adapter having an exterior port adapted to receive the hardened fiber optic connector of FIG. 12.

The outer shroud 317 has a keying feature 318 that ensures the hardened fiber optic connector 310 is loaded into a mating connecting component (e.g., a mating fiber optic adapter or a mating fiber optic connector) at a particular rotational orientation. FIG. 15 shows an example mating fiber optic adapter 349. In the depicted example, the keying feature 318 is shown as a female structure such as a notch/slot adapted to mate with a corresponding male feature (e.g., a key, rail, projection, tab, etc.) of the mating fiber optic adapter. In other example, the keying feature 318 can include a male structure (e.g., one or more tabs, keys, rails, projections, etc.) that mates with a corresponding female structure of the mating fiber optic adapter.

The robust fastening element 319 of the hardened fiber optic connector 310 is configured for mechanically coupling the hardened fiber optic connector 310 to its corresponding fiber optic adapter 349. In certain examples, the fastening element 319 mounts over the outer shroud 317 and is free to rotate about the outer shroud 317. In the depicted example, the robust fastening element 319 includes coupling nut having external threads adapted to engage internal threads of the mating fiber optic adapter. In other examples, the fastening element can include a coupling sleeve having internal threads that engage external threads of the mating fiber optic adapter. In other examples, the robust coupling can be provided by a bayonet-style coupling arrangement between the fastening element and the mating fiber optic adapter. It will further be appreciated that the interface between the hardened fiber optic connector 310 and its mating fiber optic adapter is preferably environmentally sealed by a sealing arrangement to limit or prevent the intrusion of moisture, dust or other contaminants. The sealing arrangement can include one or more sealing members (e.g., o-rings, radial seals, face seals, or other gasket-type seals) mounted on the shroud, on the connector plug body or on/in the fiber optic adapter.

Figure 16:
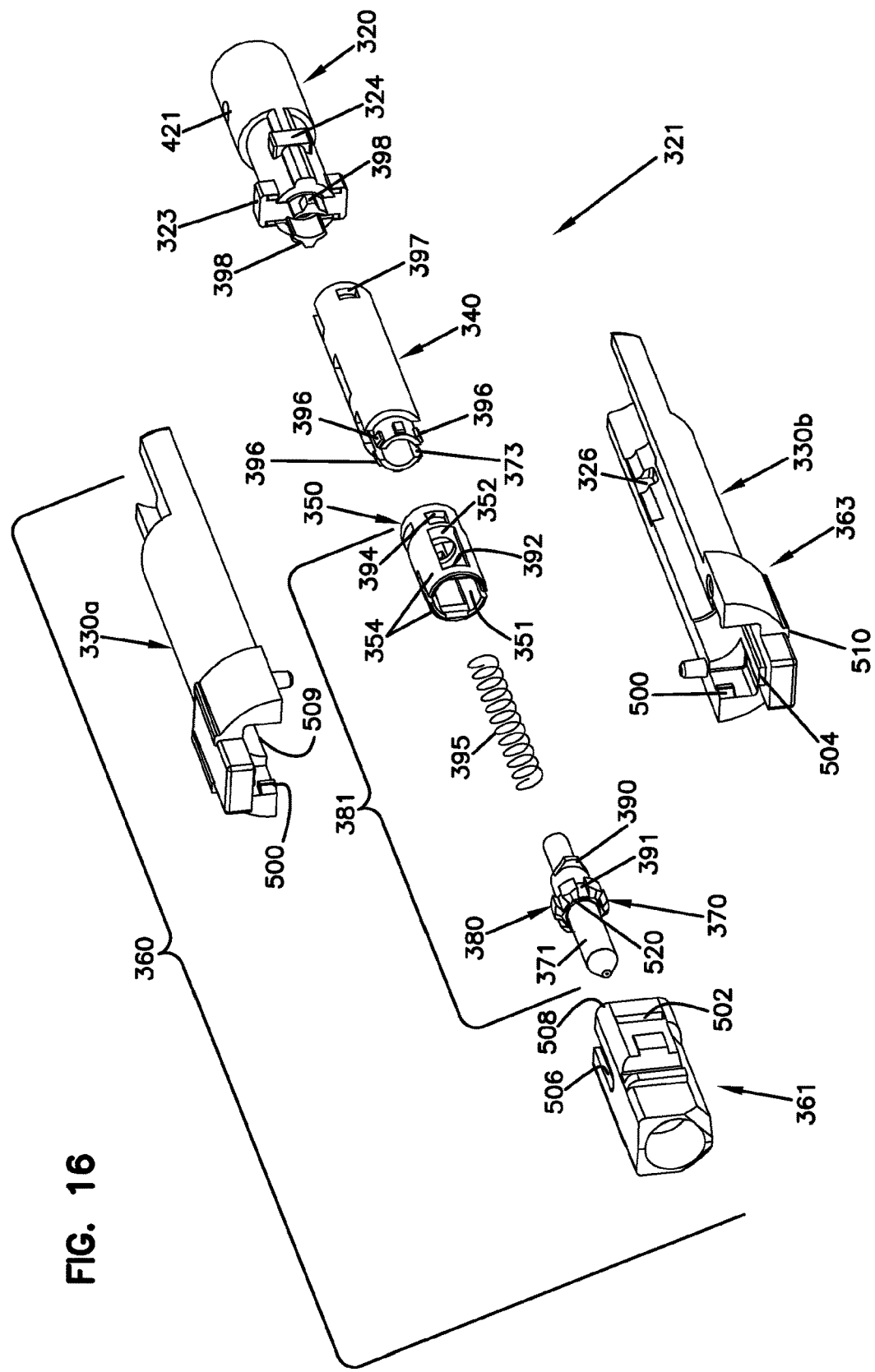
FIG. 16 is an exploded view of an inner portion of the hardened fiber optic connector of FIG. 12.
Figure 18A:
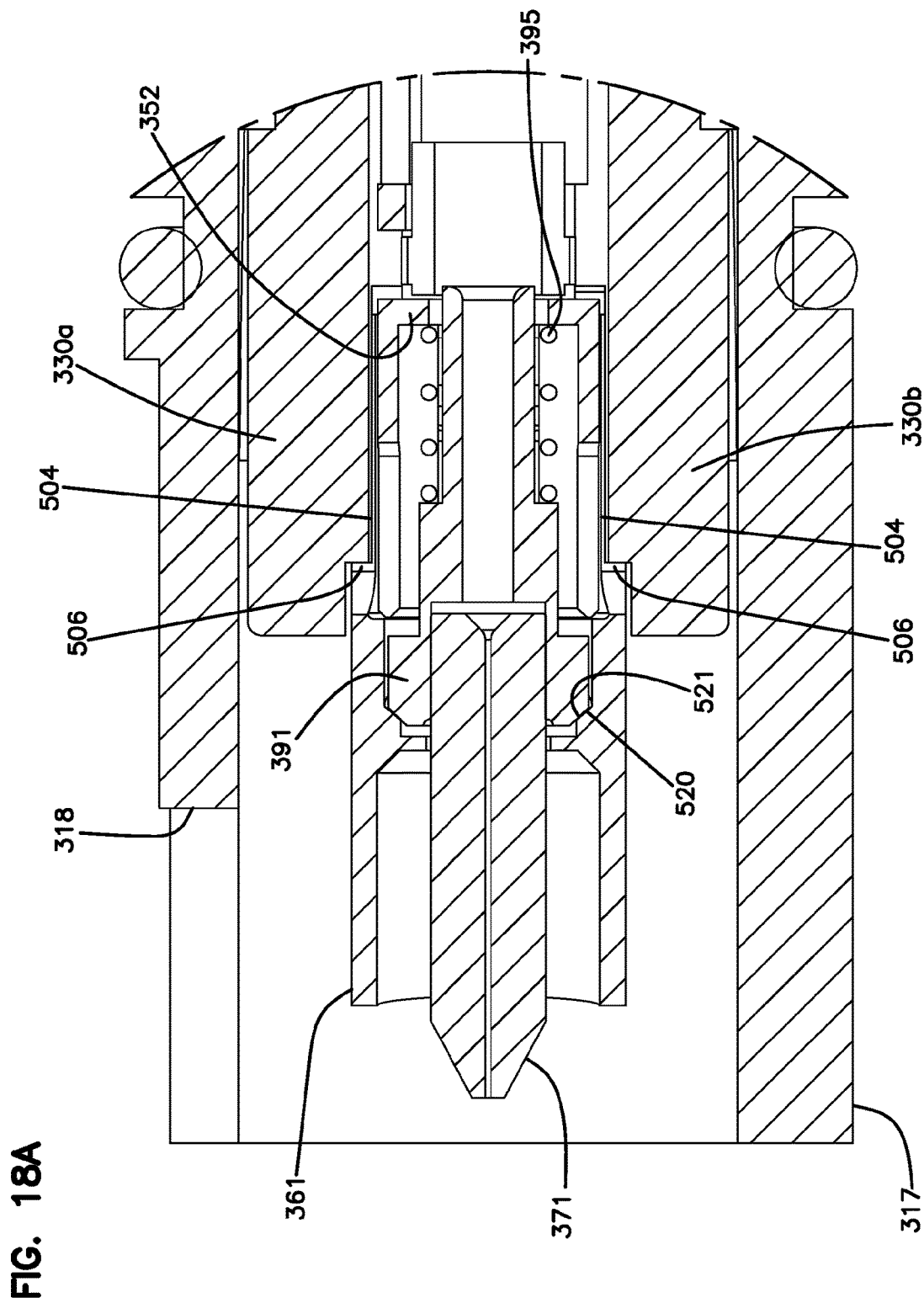
FIG. 18A is an enlarged view of a portion of FIG. 18.
Figure 18B:
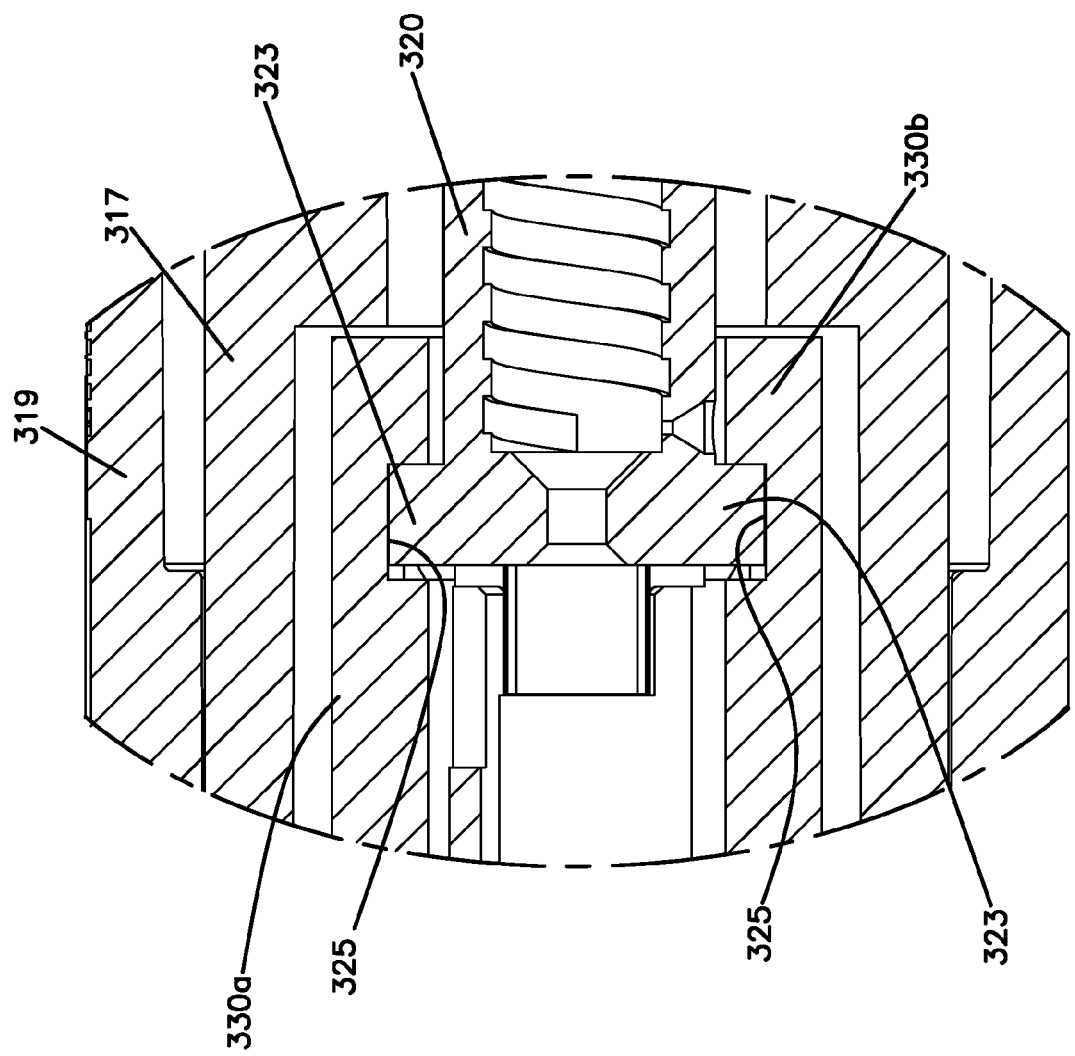
FIG. 18B is an enlarged view of another portion of FIG. 18.

As shown at FIGS. 16, 18 and 20, the tunable connector core 321 of the hardened fiber optic connector 310 includes a cable anchor 320 coupled to a ferrule subassembly 381 by an elongated extension piece 340 (e.g., an extension tube). The ferrule subassembly 381 includes a ferrule 71 in which the optical fiber 314 is secured (e.g., an end portion of the optical fiber 314 can be secured by adhesive within the ferrule 371). The ferrule subassembly 381 also includes a ferrule hub 380 secured to the ferule 371, a ferrule spring 395 and a spring retainer 350 that couples to the ferrule hub 380. The spring retainer 350 couples to the ferrule hub 380 and the ferrule spring 395 is captured between the ferrule hub 380 and the spring retainer 350. In this way, the ferrule spring 395 is pre-compressed between the spring retainer 350 and the ferrule hub 380. Thus, similar to previously described examples, the configuration of the ferrule subassembly 381 allows the ferrule spring 395 to be pre-compressed to an initial compressed state prior to loading the ferrule subassembly 381 into the plug body 360. As previously described, this assists in facilitating assembly operations and also allows the amount excess fiber length that must be accounted for during assembly to be reduced thereby allowing for shortening of the overall length of the fiber optic connector.

The spring retainer 350 is configured to couple to a front end of the extension piece 340 (e.g., by a snap-fit connection or other type of mechanical connection). The hardened fiber optic connector 310 also includes the plug body 360 that fits over the tunable connector core 321. The plug body 360 includes a front plug portion 361 in which the ferule subassembly 381 is received, and a rear portion 363 that couples to the front plug portion 361. The rear portion 363 includes mating pieces 330a, 330b that fit over the extension piece 340 and the cable anchor 320 and that fix the front plug portion 361 relative to the cable anchor 320. The mating pieces 330a, 330b retain the front plug portion 361 in position over the ferrule subassembly 381. The outer shroud 317 fits over the plug body 360. The cable anchor 320 is configured to couple to a rear end of the extension piece 340 (e.g., by a snap-fit connection or other type of mechanical connection).

The cable anchor 320 can be filled with adhesive (e.g., epoxy) via port 421 and functions to anchor the cable strength members 316 of the fiber optic cable 312 to the tunable connector core 321 and also serves as an axial fixation location for the optical fiber 314 of the fiber optic cable 312. The optical fiber 314 can be pulled back away from ferrule subassembly 381 before applying the epoxy or before the epoxy cures to remove excess fiber length from within the tunable connector core 321.

The extension piece 340 provides space for allowing the optical fiber 314 to buckle when the ferrule 371 is pushed back in direction 372 (FIG. 12) when the hardened fiber optic connector 310 is coupled to another connector. In one example, the rear end of the extension piece 340 connects to the front end of the cable anchor 320 by a snap fit connection. In certain implementations, tabs 398 of the cable anchor 320 snap within openings 397 of the extension piece 340 (see FIGS. 16 and 20A). The extension piece 340 can include a full length longitudinal slot 373. The extension piece 340 can be added to the tunable cable core 321 after placement of the cable anchor 320 on the fiber optic cable 312 and after the optical fiber 314 has been secured to the ferrule 371 and the end face of the ferrule 371 has been processed (e.g., polished). The longitudinal slot 373 allows the extension piece 340 to be laterally inserted over the optical fiber 314.

Figure 20A:
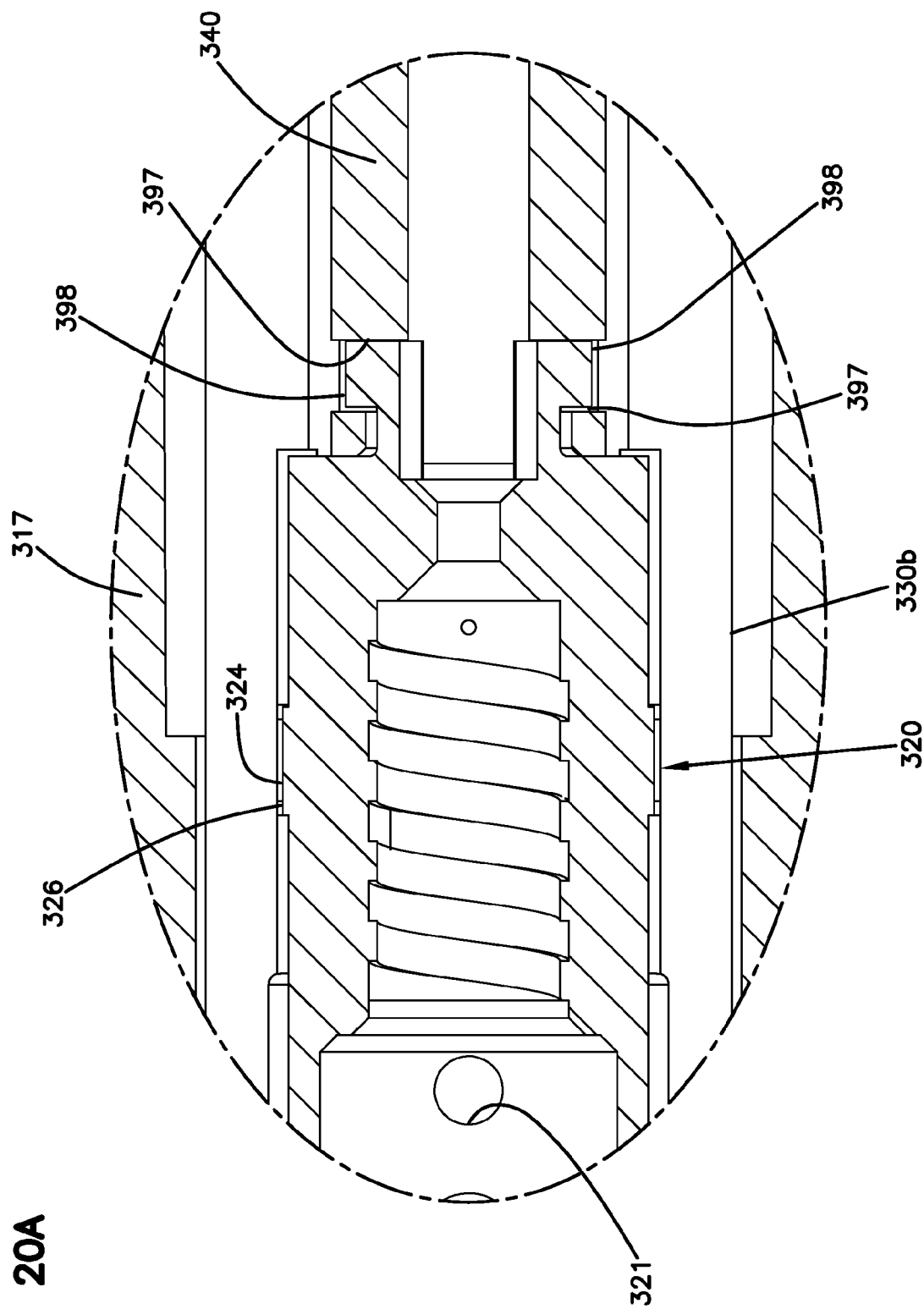
FIG. 20A is an enlarged view of a portion of FIG. 20.
Figure 20B:
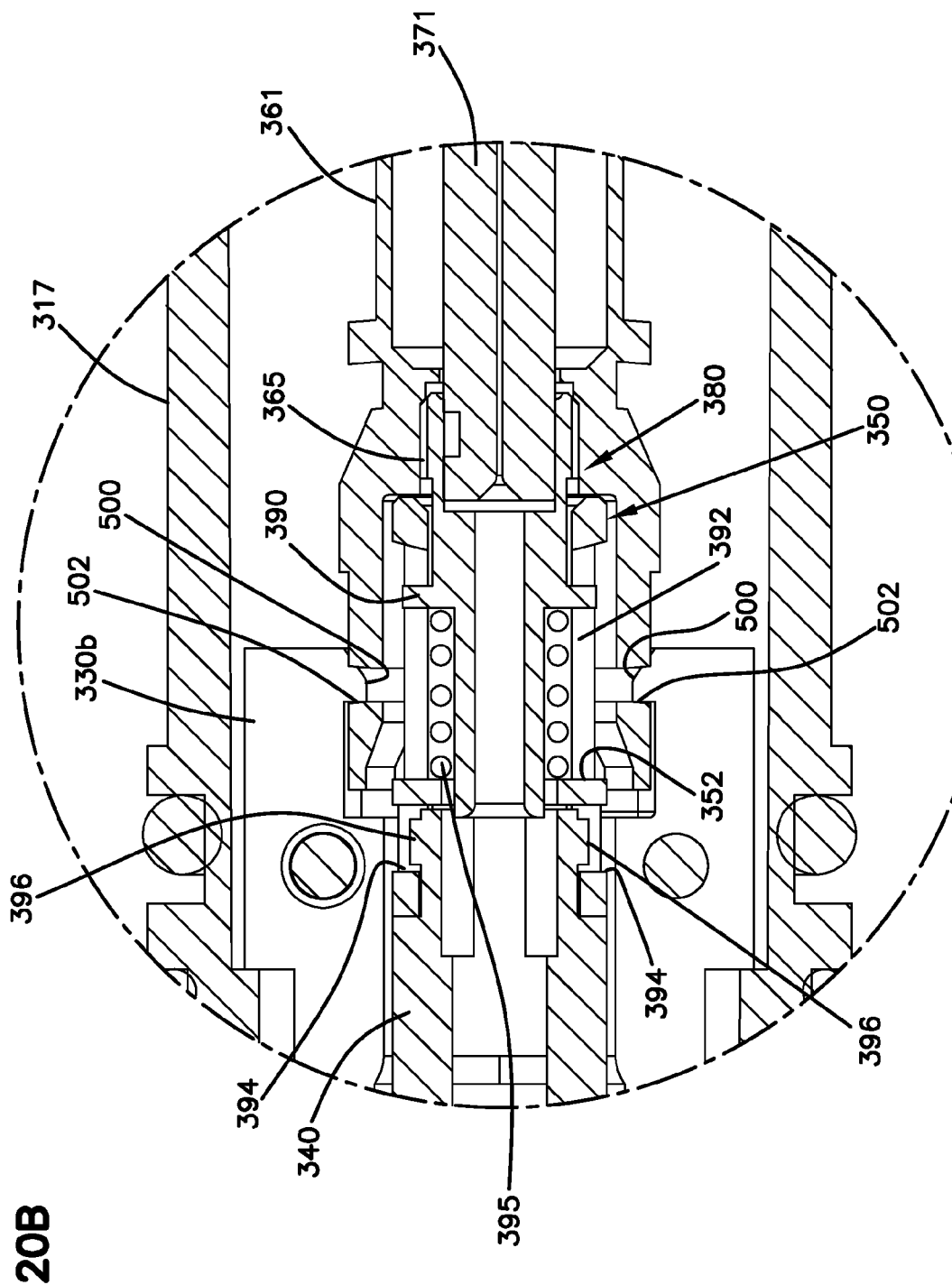
FIG. 20B is an enlarged view of another portion of FIG. 20.

The ferrule 371 and the ferrule hub 380 form a ferrule unit 370 that is biased forwardly relative to the spring retainer 350 by the ferrule spring 395. The ferrule hub 380 includes a notched circumferential flange 391 and tabs 390. The spring 395 is loaded into an interior 351 of the spring retainer 350 and is held therein by the ferrule unit 370. For example, the ferrule spring 395 can be captured between the tabs 390 of the ferrule unit 370 and an annular spring engagement shoulder 352 of the spring retainer 350 as shown in FIG. 20B. When assembled, the tabs 390 fit within axially elongated slots 392 of the spring retainer 350 to secure the ferrule unit 370 to the spring retainer 350 (see FIG. 20B). The spring 395 biases the ferrule unit 370 in a forward direction 374 (FIG. 12) and the tabs 390 can slide along the elongated slots 392 to allow relative axial movement between the ferrule unit 370 and the spring retainer 350.

The elongated slots 392 of the spring retainer 350 are defined within flexible arms 354 that flex apart to accommodate the tabs 390 during assembly of the ferrule subassembly 381. The rear end of the spring retainer 350 can attach to the front end of the extension piece 340 by a snap-fit connection or other type of mechanical connection. For example, tabs 396 of the extension piece 340 can snap within openings 394 of the spring retainer 350 (see FIGS. 16 and 20B). The spring retainer 350 and thus the entire ferrule subassembly 381 can be rotated relative to the extension piece 340 about a central longitudinal axis of the ferrule 371 to position a core eccentricity of the optical fiber 314 within the ferrule 371 at a desired rotational position (e.g., a rotational position that aligns with a key of the hardened fiber optic connector 310 or other rotational position). In the example shown, the extension piece 340 has six tabs 396 and the extension piece 340 has six corresponding openings 394 that enable the ferrule subassembly 381 to be rotated relative to the extension piece 340 to six different rotational tuning positions to tune the hardened fiber optic connector 310. In some examples, the ferrule subassembly 381 can be initially rotated to the desired tuned rotational position and then connected to the extension piece 340 while being pre-oriented at the desired tuned rotational position. In other examples, the ferrule subassembly 381 can be initially connected to the extension piece 340 and then rotated to the desired tuned rotational position after connection to the extension piece 340.

Figure 21:
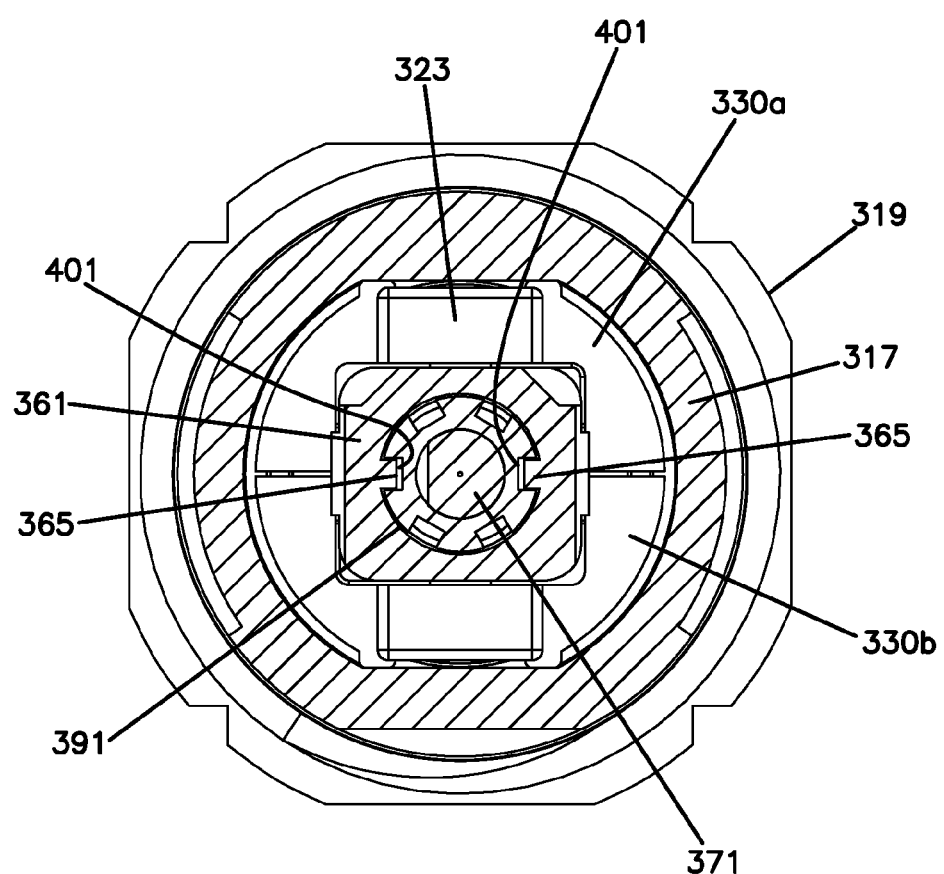
FIG. 21 is a cross-sectional view taken along section line 21-21 of FIG. 19.

The front plug portion 361 fits over the ferrule subassembly 381 after the ferrule subassembly 381 has been rotated to the desired tuned position. Rails 365 within the front plug portion 361 fit within notches 401 of the notched circumferential flange 391 to further prevent relative rotation between the ferrule subassembly 381 and the front plug portion 361 once the plug body 360 has been installed over the tunable connector core 321 (see FIGS. 20B and 21). Angled front surfaces 520 (see FIGS. 16 and 18A) of the ferrule hub 380 are preferably spring biased against corresponding angled shoulder surfaces 521 (see FIG. 18A) within the front plug portion 361. The angled shoulder surfaces 521 form a seat within the front plug portion against which the angled front surfaces 520 at the front of the ferrule hub 380 are spring biased.

The mating pieces 330a, 330b of the rear portion 363 of the plug body 360 couple the front plug portion 361 to the cable anchor 320. The rear portion 363 is rotationally keyed and axially fixed relative to the cable anchor 320. In certain implementations, the cable anchor 320 includes projections 323, 324 (FIGS. 16, 18B and 20A) that fit within receptacles 325, 326 of the mating pieces 330a, 330b (see FIGS. 16, 18B, and 20A). The projections 323, 324 and the receptacles 325, 326 are relatively axially positioned with regard to the angled front surfaces 520 and the angled shoulder surfaces 521 such that during loading of the connector core 321 into the plug body 360, the angled front surfaces 520 of the ferrule hub 380 are forced against the angled shoulder surfaces 521 causing further compression of the ferrule spring 395 from the initial pre-compressed state to a final compressed state. In this way, mechanical tolerances are accounted for thereby ensuring that the angled front surfaces 520 seat against the angled shoulder surfaces 521.

The front plug portion 361 is rotationally keyed and axially fixed relative to the mating pieces 330a, 330b that form the rear portion 363. For example, tabs 500 (FIGS. 16 and 20B) on the mating pieces 330a, 330b fit (e.g., snap-fit) within openings 502 (FIGS. 16 and 20B) defined in the front plug portion 363 (see FIG. 20B). Rails 504 (FIGS. 16 and 18A) of the mating pieces 330a, 330b may fit within slots 506 (FIGS. 16 and 18A) defined in the front plug portion 361 (see FIG. 18A). A back end 508 of the front plug portion 361 has a square transvers cross-sectional shape and fits within a square receptacle 509 of the rear portion 363 to further rotationally key and axially fix the front plug portion 361 relative to the rear portion 363 of the plug body 360.

Figure 22:
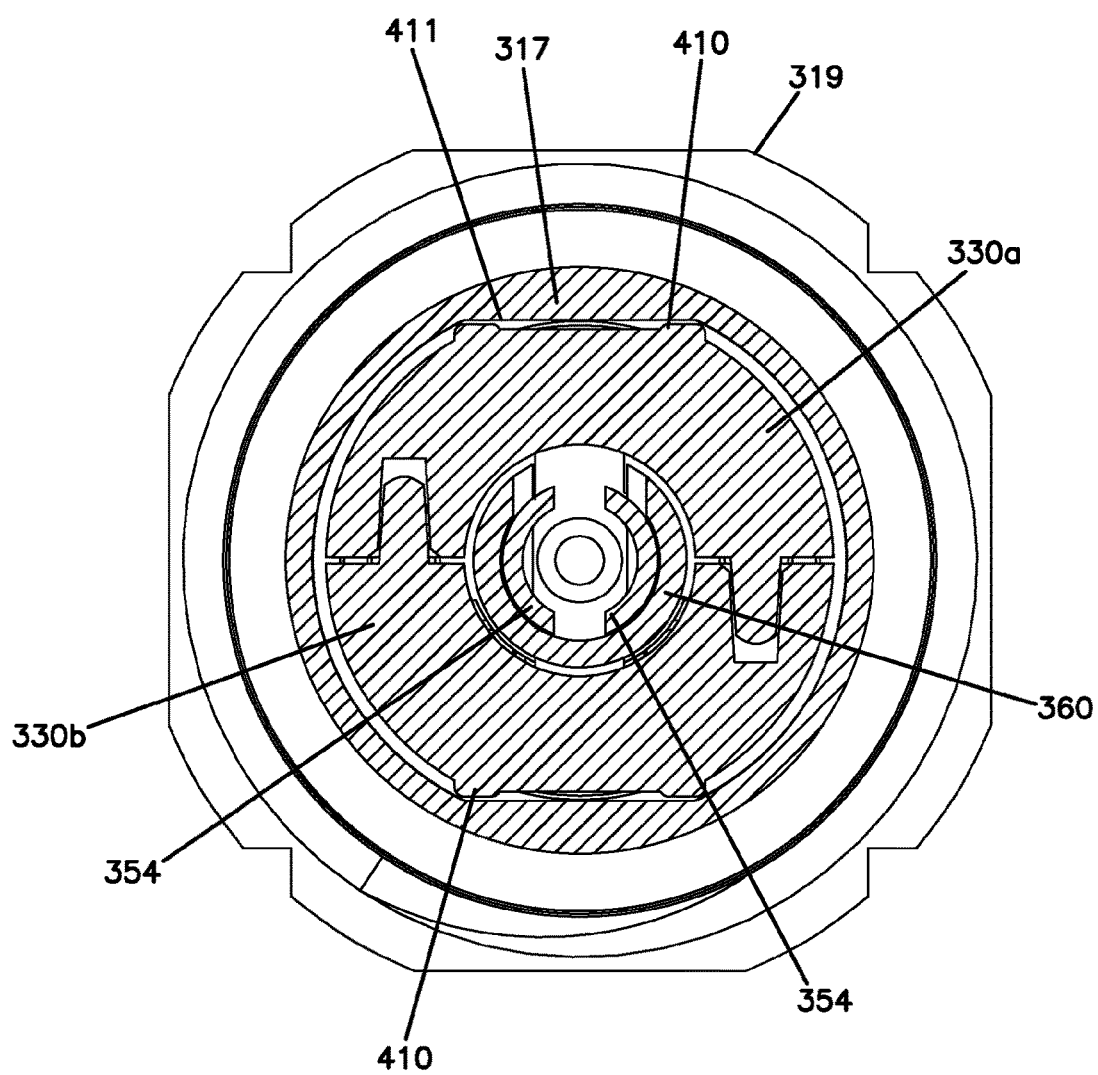
FIG. 22 is a cross-sectional view taken along section line 22-22 of FIG. 19.

The outer shroud 317 mounts over the plug body 360. The rear portion 363 of the plug body 360 is rotationally keyed relative to the outer shroud 317 by opposing flats 410, 411 of the plug body 360 and the outer shroud 317 (see FIG. 22).

The longitudinal slot 373 defined through the entire length of the extension piece 340 allows it to be added, or removed, if desired. One advantage of making the spring retainer 350 and the extension piece 340 separate pieces is that the extension piece 340 can be added to the tunable connector core 321 after the ferrule subassembly 381 has been fully assembled, the optical fiber 314 has been secured in the ferrule 371, and the end face of the optical fiber 314 has been fully processed (e.g., polished, laser treated, laser cleaved, etc.). In this way, extra fiber length is made available to facilitate using the fiber processing equipment and enhancing fiber processing operations. The final fiber length within the connector is established by assembling the connector, pulling the rearwardly cable to a desired position, then anchoring the cable strength members and the cable fiber within the cable anchor with epoxy injected in the cable anchor.

Figure 23:
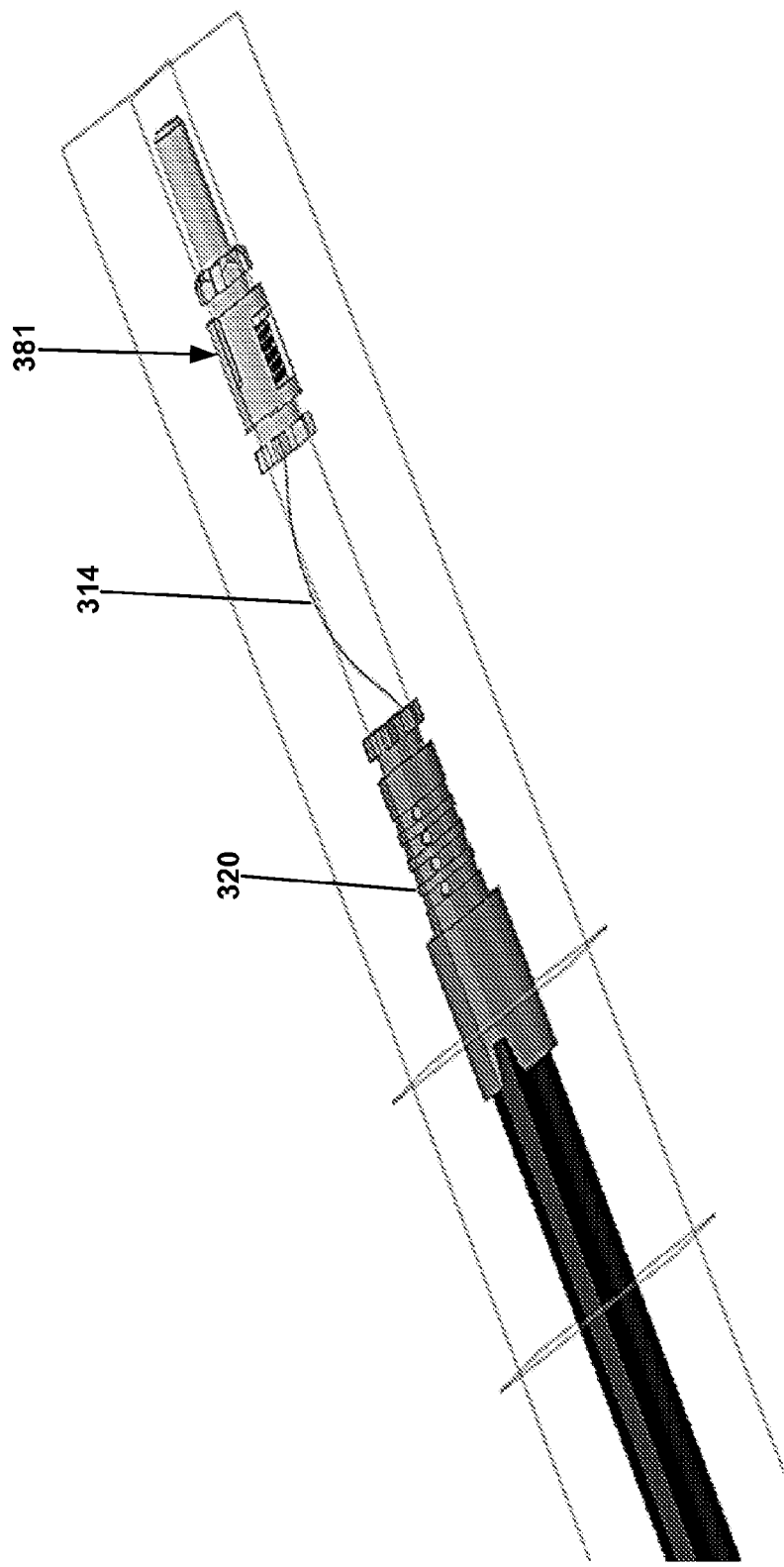
FIG. 23 shows an assembly step of a tunable connector core of the hardened fiber optic connector of FIG. 12.
Figure 24:
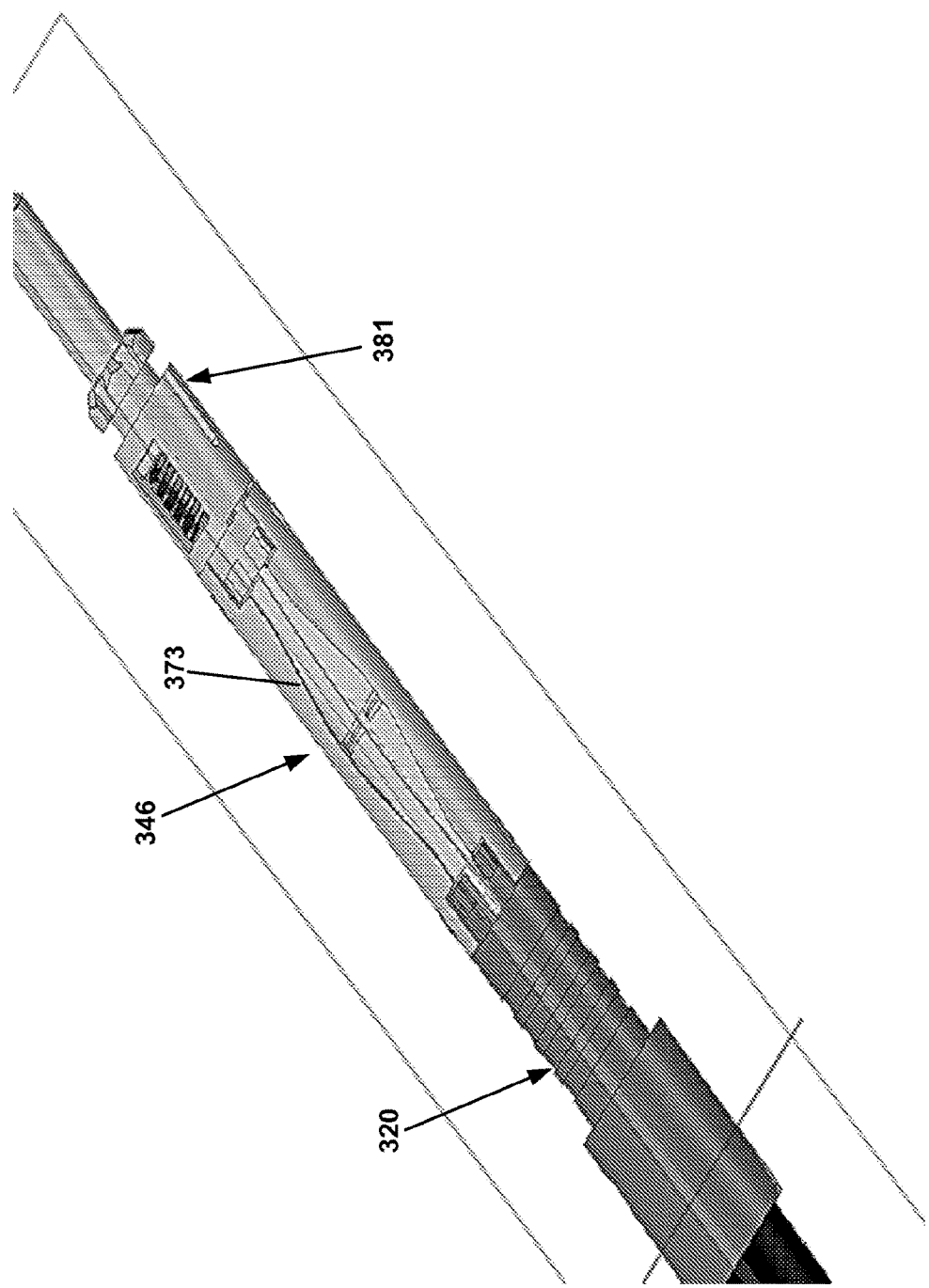
FIG. 24 shows another assembly step for the tunable connector core.

In terminating the fiber optic cable 312 with the hardened fiber optic connector 310, the end of the fiber optic cable 312 is first prepared by stripping the outer jacket to expose the optical fiber and strength members, and by cleaving and stripping the optical fiber as needed. The ferrule assembly 381 is pre-assembled thereby pre-compressing the ferrule spring 395 between the ferrule hub 380 and the spring retainer 350. The strain relief boot 311, the robust fastening element 319 and the outer shroud 317 can be slid over the cable jacket 315. The cable anchor 320 is inserted over the exposed optical fiber 314 and the strength members 316 and a portion of the jacket 315 of the fiber optic cable 312 are positioned within the cable anchor 320. The end of the optical fiber 314 then is secured within the ferrule 371 of the pre-assembled ferrule subassembly 381 (see FIG. 23). The end faces of the ferrule 371 and the optical fiber 314 are then polished or otherwise processed to angle, shape and/or remove imperfections from the end face of the optical fiber 314. After fiber processing, a direction of core eccentricity of the fiber core relative to the ferrule 371 is determined and marked on the ferrule 371 or ferrule hub 380 to provide an indication of core eccentricity. The extension piece 340 is then inserted laterally over the optical fiber 314 and is mounted between the cable anchor 320 and the ferrule subassembly 381 to complete assembly of the connector core 321 (see FIG. 24). The ferrule subassembly 381 is then rotated as needed relative to the extension piece 340 generally about a central longitudinal axis of the ferrule 371 to move the direction of core eccentricity to a tuned rotational position relative to the cable anchor 320. Because the cable anchor 320 is rotationally keyed relative to the plug body 360, tuning relative to the cable anchor 320 provides tuning relative to the plug body 360. After tuning, the fiber optic cable 312 can be pulled rearwardly relative to the assembled tunable connector core 321 to remove excess optical fiber from within the extension piece 340. Once the excess optical fiber has been removed, adhesive can be injected into the cable anchor 320 to anchor the fiber optic cable 312 (e.g., the strength members 316 and the jacket 315) relative to the tunable connector core 321 and to provide an axial fixation location for the optical fiber 314.

After curing of the adhesive, the tunable connector core 321 is loaded into the plug body 360. In one example, one of the mating pieces 330a, 330b is initially snapped onto the front plug portion 361. The front end of the connector core 321 is then inserted into front plug portion 361 through the back end of the front plug portion 361. Insertion continues causing the angled front surfaces 520 of the ferrule hub 380 to abut against the angled shoulder surfaces 521 within the front plug portion 361. Insertion continues after contact between the surfaces 520, 521 causing further compression of the ferrule spring 395. Insertion continues further until the projections 323, 324 snap into the corresponding receptacles 325, 326 in the mating piece 330a or 330b thereby axially fixing the tunable connector core 321 in axial position relative to the plug body 360. The other mating piece 330a or 330b is then snapped in place to complete assembly of the inner arrangement 313. Finally, the outer shroud 317 can be slid over the inner arrangement 313, sealing can be provided between the outer shroud 317 and the fiber optic cable 312 (e.g., with a heat shrink sleeve pre-loaded over the cable), the robust fastening element 319 can be slid over the outer shroud 317 and the strain relief boot 311 can be mounted to the rear end of the outer shroud 317.

In certain implementations, the hardened fiber optic connector 310 is a hardened connector. For example, in certain implementations, the hardened fiber optic connector 310 also includes one or more environmental seals for providing a sealed interface with an adapter port. As noted above, the hardened fiber optic connector 310 also includes a robust fastening element 319, such as a threaded member or a bayonet style fastener, for securing the connector 310 in the adapter port.

In another example, the tunable connector core can be used in combination with other types of plug bodies. For example, the tunable connector core can be used in combination with the plug body 34 of FIG. 3.

PARTS LIST 20 hardened fiber optic connection system
22 fiber optic adapter
24 non-hardened fiber optic connector
26 hardened fiber optic connector
28 first port
30 second port
32 seal
34 plug body
36 plug end
38 ferrule
40 fastening element
41 central longitudinal axis
42 threads
44 corresponding threads
46 fiber optic cable
48 optical fiber
50 jacket
52 strength elements
54 connector core
56 dust cap
58 main body
60 side cover
62 metal sleeve
64 shape memory sleeve
66 boot
68 lanyard
70 ferrule subassembly
71 ferrule
72 extension piece
74 cable anchor
78 interlock structures
79 mating structures
80 ferrule hub
82 ferrule spring
84 spring retainer
86 tabs
88 openings
89 open through-slot
91 ferrule unit
92 front flange
94 forward end
96 front face
98 optical fiber stub
100 front end
102 rear end portion
104 splice location
106 rear hub portion
108 outer shell
110 longitudinal slot
112 port
113 splice encapsulating material
114 flats
116 front angled surfaces
120 interlock feature
122 opening
130 fixture
132 first portion
134 second portion
136 spring
220 ferrule
221 optical fiber
222 fiber core
224 cladding
305 loose or tight buffer
307 core
309 cladding layer
310 hardened fiber optic connector
311 strain relief boot
312 fiber optic cable
313 inner arrangement
314 optical fiber
315 jacket
316 strength members
317 outer shroud
318 keying feature
319 robust fastening element 320 cable anchor
321 tunable connector core
323, 324 projections
325, 326 receptacles
330a, 330b mating pieces
340 elongated extension piece
349 mating fiber optic adapter
350 spring retainer
351 interior
352 spring engagement shoulder
354 flexible arms
360 plug body
361 front plug portion
363 rear portion
365 rails
370 ferrule unit
371 ferrule
372 direction
373 longitudinal slot
374 forward direction
380 ferrule hub
381 ferrule subassembly
390 tabs
391 circumferential flange
392 elongated slots
394 openings
395 ferrule spring
396 tabs
397 openings
398 tabs
401 notches
410, 411 opposing flats
421 port
500 tabs
502 openings
504 rails
506 slots
508 back end
509 square receptacle
520 angled front surfaces
521 angled shoulder surfaces

What is claimed is:

1. A method for assembling a fiber optic connector, the fiber optic connector including a ferrule subassembly including a ferrule, a ferrule hub that attaches to the ferrule, a spring holder and a connector spring, the fiber optic connector including a plug body in which the ferrule subassembly mounts, the plug body having a plug end through which the ferrule extends when the ferrule subassembly is mounted within the plug body, the plug body defining a central longitudinal axis, the method comprising:
pre-assembling the ferrule subassembly such that the connector spring is pre-compressed in an initial compressed state between the ferrule hub and the spring holder;
loading the pre-assembled ferrule subassembly into the plug body and applying a secondary compression force to the connector spring as the pre-assembled ferrule assembly is loaded into the plug body to move the connector spring to a final compressed state; and
securing the ferrule subassembly in axial position relative to the plug body to retain the connector spring in the final compressed state;
wherein the ferrule subassembly is incorporated into a connector core, and wherein the ferrule subassembly is secured in axial position relative to the plug body by mechanically interlocking the connector core with the plug body; and
wherein the fiber optic connector is adapted to be secured to an end of a fiber optic cable, wherein the fiber optic cable includes an optical fiber coupled with the ferrule, wherein the connector core includes a cable anchor to which a strength member of the fiber optic cable is secured, and wherein prior to securing the strength member of the cable to the cable anchor, the cable is pulled back relative to the connector core to remove excess length of the optical fiber from within the connector core.

2. The method of claim 1, wherein the cable is pulled back with a force less than or equal to a spring force of the connector spring.

3. The method of claim 1, wherein the fiber optic connector is assembled on a fixture, and wherein the fixture includes a fixture spring for pulling back the fiber optic cable relative to the cable core.

4. The method of claim 3, wherein the fixture spring has a spring force less than or equal to a spring force of the connector spring.

5. The method of claim 1, wherein a stub optical fiber is secured within the ferrule, and wherein the optical fiber of the fiber optic cable is spliced to the stub optical fiber.

6. The method of claim 5, wherein the fiber optic connector is tuned by rotationally orienting the ferrule at a desired rotational orientation prior to splicing the stub optical to the optical fiber of the fiber optic cable.

7. The method of claim 6, further comprising encasing the splice in an adhesive filled shell after splicing, the adhesive filled shell forming a part of the ferrule hub.

8. The method of claim 1, wherein the ferrule subassembly can be rotated relative to a remainder of the connector core to tune the fiber optic connector.

9. A fiber optic connector comprising:
a plug body having a plug end;
a connector core that mounts within the plug body, the connector core including a ferrule subassembly the ferrule subassembly including a ferrule, a ferrule hub that attaches to the ferrule, a spring holder and a connector spring, wherein the ferrule sub-assembly is assembled with the connector spring pre-compressed to an initial compressed state prior to mounting the connector core within the connector body; and
wherein the plug body and the core are configured such that the connector spring is moved from the initial compressed state to a final compressed state when the connector core is loaded in the plug body;
wherein the connector core includes an extension piece, and wherein the ferrule subassembly mounts to one end of the extension piece; and
wherein the ferrule subassembly is mountable in a plurality of different rotational positions relative to the extension piece to allow for tuning of the fiber optic connector.

10. The fiber optic connector of claim 9, wherein the connector core interlocks with the plug body to retain the spring in the final compressed state.

11. The fiber optic connector of claim 9, wherein a cable anchor mounts to an opposite end of the extension piece.

* * * * *